United States Patent
Usami et al.

(10) Patent No.: US 6,591,009 B1
(45) Date of Patent: Jul. 8, 2003

(54) INFORMATION EMBEDDING METHOD, APPARATUS AND RECORDING MEDIUM

(75) Inventors: Yoshinori Usami, Kanagawa-ken (JP); Akira Yoda, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/362,368

(22) Filed: Jul. 28, 1999

(30) Foreign Application Priority Data

Jul. 28, 1998 (JP) .......................... 10-212088
Jul. 23, 1999 (JP) .......................... 11-209222

(51) Int. Cl.⁷ .................. G06K 9/36; H04L 7/167; H04L 9/00
(52) U.S. Cl. .............. 382/165; 382/164; 382/232; 382/234; 380/201; 380/210; 713/176; 713/179
(58) Field of Search .............. 382/167, 166, 382/164, 232, 233, 248, 249, 251, 100, 219, 234, 181, 196; 358/518, 520, 523, 538; 380/51, 54, 210, 252, 287, 201; 713/176, 179

(56) References Cited

U.S. PATENT DOCUMENTS

| | | | | |
|---|---|---|---|---|
| 5,361,147 A | * | 11/1994 | Katayama et al. | 358/532 |
| 5,568,570 A | * | 10/1996 | Rabbani | 382/238 |
| 5,606,609 A | * | 2/1997 | Houer et al. | 380/4 |

FOREIGN PATENT DOCUMENTS

| | | |
|---|---|---|
| JP | 8289159 | 11/1996 |
| JP | 9214636 | 8/1997 |
| JP | 10108180 | 4/1998 |

OTHER PUBLICATIONS

Kineo Matsui, "Electronic Watermark," in O Plus E No. 213, Aug. 1997, pp. 70–77 (w/English language translation).
Kineo Matsui, "Deep Cryptograph for an Image," Morikita publication, 1993, pp. 34–57 (w/English language translation).

* cited by examiner

Primary Examiner—Jayanti K. Patel
Assistant Examiner—Yosef Kassa
(74) Attorney, Agent, or Firm—Birch, Stewart, Kolasch & Birch, LLP

(57) ABSTRACT

To deeply encrypt and embed auxiliary information into image data, table generation means generates a table, based on a quantization error which occurs when image data S0 is converted from a first color space, to which the image data S0 belongs, to a second color space that is a destination of conversion. The table represents which color coordinate of a second color space a color coordinate of a first color space is mapped onto. In coding means, information H0 to be embedded is coded by referring to the table, whereby coded auxiliary information H1 is obtained. When the image data S0 is converted in color conversion means, the auxiliary information H1 is embedded into the quantization error, whereby image data S1 embedded with the auxiliary information H1 is obtained.

39 Claims, 15 Drawing Sheets

FIRST COLOR SPACE    SECOND COLOR SPACE

FIRST COLOR SPACE    SECOND COLOR SPACE

INFORMATION EMBEDDING METHOD, APPARATUS AND RECORDING MEDIUM

BACKGROUND OF THE INVENTION

1. Field of the Invention

The present invention relates to an information embedding method and apparatus for deeply encrypting and embedding into image data auxiliary information related to this image data and to a computer readable recording medium having recorded a program for causing a computer to execute the information embedding method.

2. Description of the Related Art

With advancement in the digitalization of image data, it has become general knowledge that image data, taken from various digital input units such as a digital camera, a scanner and the like, is output with a variety of digital image output units, such as a color printer, a CRT display unit, a photo-engraving unit and the like. Furthermore, such image data has been handled in an open environment by readjustment of network infrastructure. With this, the protection of rights, such as a design right and copyright, produced by generation or processing of digital image data has become a problem.

For this reason, a variety of techniques for deeply encrypting and embedding the certified information or copyright information of image data (hereinafter referred to as auxiliary information) into the image data have been proposed (e.g., Japanese Unexamined Patent Publication Nos. 8(1996)-289159, 10(1998)-108180, 9(1997)-214636, etc.). These techniques embed certified information or copyright information into the redundancy portion of image data, whereby only reproducing the image data cannot confirm the embedded information; however, the techniques are capable of reading out the information embedded into the data and performing a display or the like, by employing a device or software for reading out the information. For this deep encryption, the details are described in various references (e.g., Kineo Matsui, "Electronic Watermark," in O plus E No. 213, August 1997).

As such a technique of deep encryption, various techniques, such as a pixel space utilizing type, a quantization error utilizing type, a frequency area utilizing type and the like, are known. The pixel space utilizing type is a method of taking out, for example, a plane of 3×3 pixels adjacent to an object pixel and embedding auxiliary information into 8 bits around this plane. The quantization error utilizing type is a method of directing attention to a quantization error occurring in the process of compressing image data and of controlling quantized output to an even number and an odd number by the 0 and 1 in the bit sequence of auxiliary information and apparently embedding the auxiliary information into image data as quantization noise. For this quantization error utilizing type, the details are described in "Deep Cryptograph for an Image" (Kineo Matsui, Morikita publication, 1993). The frequency area utilizing type is a method of embedding auxiliary information into a frequency area visually insensitive on an image area. For instance, the high-frequency component in an image is a visually insensitive area, so image data is separated into a plurality of frequency bands, auxiliary information is embedded into a high-frequency band, and furthermore, the frequency bands are reconstructed to the image data, whereby the auxiliary information can be embedded. Also, with regard to human visual property, there is an area that generally color difference or color saturation information is lowered in ability to discriminate gradation more than brightness information and invisible recording becomes possible in the portion of a difference between the brightness information and the color difference or color saturation information. Therefore, auxiliary information can also be embedded into this area.

Besides, a method of embedding auxiliary information into a bit plane whose S/N ratio is poor as an image, by mixing the information with the redundancy of noise; a method of embedding auxiliary information into the redundancy of an information variation in a pixel block (space) in a certain range; a method of embedding auxiliary information into a quantization error when the amount of data information shrinks by coding in performing data compression and the like are enumerated.

Here, a description will be made of an information embedding method that takes advantage of the information conversion redundancy of the pixel block in a density pattern for expressing gradation in a binary image.

There is a density pattern method as a method of expressing multi-level gradation by binary bit mapping. FIG. 23 is a model case of expressing gradation by a change in the area of 4 binary pixels employed as one unit. Here, the number of gradations, Leq, which can be represented in terms of the number of specified bits, L, and the number of pixels, n×n, can be represented by the following Eq. (1):

$$Leq = (L-1)n^2 + 1 \qquad (1)$$

Therefore, the case shown in FIG. 23 can express 5 gradations. Also, as clear from FIG. 23, a plurality of patterns indicating a single quantization level (of the same gradation) are present depending upon which of the four pixels puts up a bit that becomes black. For example, quantization levels 0 and 4 can take only a single pattern, but quantization levels 1 and 3 have 4 possible patterns and quantization level 2 has 6 possible patterns. That is, the number of patterns is determined by a combination array of m black pixels and $(n^2-m)$ white pixels in an array of $n^2$ pixels, so $n^2 C_m$ possible patterns per gradation are considered. By taking advantage of redundant pixel array patterns with respect to the same quantization level, it is possible to represent another piece of information.

If it is assumed that another piece of information in this case is an integral number, the information will be allocated 4 integral numbers and have 2 bits, for example, in the case of quantization level 1. That is, in the case of quantization level m, the number of allocated bits, BITm, is calculated as:

$$BITm = [\log_2(n^2 C_m)] \qquad (2)$$

Therefore, in the case of quantization level 2, $$BIT2 = [\log_2(2^2 C_2)] = \log_2 6 = 2.585$$

from Eq. (2). In addition, the number of quantization bits that can be represented by the entire block of 4 pixels becomes:

$$BIT0 + BIT1 + BIT2 + BIT3 + BIT4 = 0 + 2 + 2.585 + 2 + 0 = 6.585 \text{ bits}$$

In this manner, the pixel position of putting up a bit that becomes black can be represented in the redundancy as a single piece of information. That is, there are only quantization levels 0 and 4 as visual information, but in terms of the redundancy of another piece of information, there are thus various variations in each quantization level.

Note that if the number of pixels constituting each block increases, the redundancy will become great and the amount of information that can be embedded will increase, however, on the other hand, this block will become recognized as a unit beyond the integration effect of visual sense and image quality will be lost. Therefore, the visual property and the amount of information to be embedded are in a trade-off relationship.

SUMMARY OF THE INVENTION

An object of the present invention is to provide a novel method for embedding auxiliary information, such as the above-mentioned, into image data.

If image data in a certain color space is converted to a color space differing in color reproduction characteristic from this color space, distortion will occur in the color space. Because of this distortion, quantization resolution shrinks or increases when mapping of data is performed between both color spaces. For this reason, unless the error is diffused to some degree, a color space cannot be converted. The present invention embeds auxiliary information by taking advantage of the quantization error that occurs when this color space is converted.

That is, an information embedding method according to the present invention is an information embedding method of deeply encrypting and embedding into image data auxiliary information related to said image data, said information embedding method comprising the steps of:

when said image is converted from a first color space, to which said image belongs, to a second color space having a color reproduction characteristic differing from said first color space, calculating a quantization error in converting said image data to said second color space, based on a difference in color reproduction characteristic between said first and second color spaces; and encrypting and embedding said auxiliary information into said quantization error.

Here, the "deeply encrypting and embedding" means to embed auxiliary information into the redundant portion of original data.

In the information embedding method of the present invention, it is preferable to decide a difference in gamut between said first color space and said second color space and it is also preferable that for a color space inside a gamut in both color spaces, a geometrical error be calculated as said quantization error. The geometrical error occurs when a color coordinate in said first color space is converted to a corresponding color coordinate in said second color space.

Here, the "color coordinate" means a coordinate position of prescribing a color in a certain color space.

In addition, it is preferable that a difference in gamut between said first color space and said second color space be decided and that a color space in said second color space outside the gamut of said first color space be compressed inside the gamut of said first color space and it is also preferable that an error occurring by the compression be calculated as said quantization error.

Here, the "gamut" means a boundary as a color space.

Furthermore, it is preferable that said auxiliary information be embedded into a quantization error in a space where a quantization resolution of said first color space shrinks or increases.

More specifically, in a preferred form of the present invention, a first conversion table for converting a color coordinate in said first color space to a corresponding color coordinate in said second color space and a second conversion table for converting a predetermined color coordinate in said first color space to a different color coordinate adjacent to a color coordinate in said second color space corresponding to said predetermined color coordinate are generated, and when said image data is converted from said first color space to said second color space, said auxiliary information is embedded by switching said first conversion table and said second conversion table in accordance with a position on an image represented by said image data.

Here, the "position on an image" may represent the entire area of each of the image areas into which an image is divided or may represent a pixel position at which a predetermined color coordinate appears when this image is scanned in a raster fashion.

Also, in the present invention, embedding "auxiliary information" means that auxiliary information may be embedded by coding or encoding it or may be embedded in the form of a pattern, such as characters, figures and the like.

In another form of the present invention, a first conversion table for converting a color coordinate in said first color space to a corresponding color coordinate in said second color space is generated and a plurality of second conversion tables for converting a plurality of predetermined color coordinates in said first color space to different color coordinates adjacent to color coordinates in said second color space respectively corresponding to said plurality of predetermined color coordinates are generated, said plurality of second conversion tables corresponding in number to said plurality of predetermined color coordinates, and when said image data is converted from said first color space to said second color space, a single second conversion table is selected from said plurality of second conversion tables in accordance with a content of said auxiliary information and said auxiliary information is embedded by switching said first conversion table and said selected second conversion table in accordance with a position on an image represented by said image data.

In still another preferred form of the present invention, a first conversion table for converting a color coordinate in said first color space to a corresponding color coordinate in said second color space is generated and a plurality of second conversion tables for converting a plurality of predetermined color coordinates in said first color space to different color coordinates adjacent to color coordinates in said second color space respectively corresponding to said plurality of predetermined color coordinates are generated, said plurality of second conversion tables corresponding in number to said plurality of predetermined color coordinates, and when said image data is converted from said first color space to said second color space, a single second conversion table is selected from said plurality of second conversion tables for each of a plurality of pieces of auxiliary information, and a plurality of different pieces of auxiliary information are embedded by switching said first conversion table and said selected second conversion table in accordance with a position on an image represented by said image data, while selecting said single second conversion table for each said auxiliary information.

Here, the "position on an image" may also represent the entire area of each of the image areas into which an image is divided or may represent a pixel position at which a predetermined color coordinate appears when this image is scanned in a raster fashion.

In a further preferred form of the present invention, a first conversion table for converting a color coordinate in said first color space to a corresponding color coordinate in said second color space is generated and a second conversion table for converting a plurality of predetermined color coordinates in said first color space to different color coordinates adjacent to color coordinates in said second color space respectively corresponding to said plurality of predetermined color coordinates is generated, and when said image data is converted from said first color space to said second color space, a plurality of different pieces of auxiliary information are embedded for each said color coordinate by switching said first conversion table and said second conversion table in accordance with a color coordinate on an image represented by said image data.

Furthermore, it is preferable that said plurality of different pieces of auxiliary information include partition information for partitioning positions at which said plurality of pieces of auxiliary information are embedded.

An auxiliary information reading method according to the present invention is an auxiliary information reading method of reading out auxiliary information from image data embedded with said auxiliary information by a specific form of the information embedding method of the present invention, said auxiliary information reading method comprising the steps of:

converting said image data by said first conversion table and obtaining first image data; and reading out said auxiliary information, based on a difference in color between the image data embedded with said auxiliary information and said first image data.

An image output method according to the present invention is an image output method of outputting image data embedded with said auxiliary information by a specific form of the information embedding method of the present invention, said image output method comprising the steps of:

reading out said auxiliary information from said image data; and performing a process based on said auxiliary information with respect to said image data and outputting said image data.

Note that it is preferable that in the image output method according to the present invention, said image data be given said auxiliary information so that said auxiliary information can be recognized visually and be output.

Here, the "process based on said auxiliary information" is, for example, a process of giving a photographed date to image data, if the auxiliary information is one representing the photographed date. Also, when auxiliary information represents the conditions under which image data was obtained by photographing, the process based on the auxiliary information is an image process, such as a gradation process of performing gradation on image data, based on the photographing conditions.

An information embedding apparatus according to the present invention is an information embedding apparatus for deeply encrypting and embedding into image data auxiliary information related to said image data, said information embedding apparatus comprising:

when said image is converted from a first color space, to which said image belongs, to a second color space having a color reproduction characteristic differing from said first color space, quantization error calculation means for calculating a quantization error in converting said image data to said second color space, based on a difference in color reproduction characteristic between said first and second color spaces; and embedment means for encrypting and embedding said auxiliary information into said quantization error.

Note that in a preferred form of the information embedding apparatus of the present invention, said quantization error calculation means is further provided with decision means for deciding a difference in gamut between said first color space and said second color space and is means for calculating a geometrical error, which occurs when a color coordinate in said first color space is converted to a corresponding color coordinate in said second color space, as said quantization error, for a color space inside a gamut in both color spaces.

In another preferred form of the information embedding apparatus of the present invention, said quantization error calculation means is further provided with decision means for deciding a difference in gamut between said first color space and said second color space and is means for compressing a color space in said second color space, which is outside the gamut of said first color space, inside the gamut of said first color space and for calculating an error, which occurs by the compression, as said quantization error.

Furthermore, it is preferable that said embedment means be means for embedding said auxiliary information into a quantization error in a space where a quantization resolution of said first color space shrinks or increases.

More specifically, in a further preferred form of the information embedding apparatus of the present invention, said quantization error calculation means is provided with means for generating a first conversion table for converting a color coordinate in said first color space to a corresponding color coordinate in said second color space and a second conversion table for converting a predetermined color coordinate in said first color space to a different color coordinate adjacent to a color coordinate in said second color space corresponding to said predetermined color coordinate, and said embedment means is means for embedding said auxiliary information by switching said first conversion table and said second conversion table in accordance with a position on an image represented by said image data, when said image data is converted from said first color space to said second color space.

Also, said quantization error calculation means may be provided with means for generating a first conversion table for converting a color coordinate in said first color space to a corresponding color coordinate in said second color space and a plurality of second conversion tables for converting a plurality of predetermined color coordinates in said first color space to different color coordinates adjacent to color coordinates in said second color space respectively corresponding to said plurality of predetermined color coordinates, said plurality of second conversion tables corresponding in number to said plurality of predetermined color coordinates; and said embedment means may be means for selecting a single second conversion table from said plurality of second conversion tables in accordance with a content of said auxiliary information and embedding said auxiliary information by switching said first conversion table and said selected second conversion table in accordance with a position on an image represented by said image data, when said image data is converted from said first color space to said second color space.

Furthermore, said quantization error calculation means may be provided with means for generating a first conversion table for converting a color coordinate in said first color space to a corresponding color coordinate in said second color space and a plurality of second conversion tables for converting a plurality of predetermined color coordinates in said first color space to different color coordinates adjacent to color coordinates in said second color space respectively corresponding to said plurality of predetermined color coordinates, said plurality of second conversion tables corresponding in number to said plurality of predetermined color coordinates; and said embedment means may be means for selecting a single second conversion table from said plurality of second conversion tables for each of a plurality of pieces of auxiliary information and embedding a plurality of different pieces of auxiliary information by switching said first conversion table and said selected second conversion table in accordance with a position on an image represented by said image data while selecting said single second conversion table for each said auxiliary information, when said image data is converted from said first color space to said second color space.

In addition, said quantization error calculation means may be provided with means for generating a first conversion table for converting a color coordinate in said first color space to a corresponding color coordinate in said second color space and a second conversion table for converting a plurality of predetermined color coordinates in said first color space to different color coordinates adjacent to color coordinates in said second color space respectively corresponding to said plurality of predetermined color coordinates; and said embedment means may be means for embedding a plurality of different pieces of auxiliary information for each said color coordinate by switching said first conversion table and said second conversion table in accordance with a color coordinate on an image represented by said image data, when said image data is converted from said first color space to said second color space.

Furthermore, it is preferable that said plurality of different pieces of auxiliary information include partition information for partitioning positions at which said plurality of pieces of auxiliary information are embedded.

An auxiliary information reading apparatus according to the present invention is an auxiliary information reading apparatus for reading out auxiliary information from image data embedded with said auxiliary information by a specific form of the information embedding apparatus of the present invention, said auxiliary information reading apparatus comprising:

conversion means for converting said image data by said first conversion table and obtaining first image data; and read means for reading out said auxiliary information, based on a difference in color between the image data embedded with said auxiliary information and said first image data.

An image output apparatus according to the present invention is an image output apparatus for outputting image data embedded with said auxiliary information by a specific form of the information embedding apparatus of the present invention, said image output apparatus comprising:

read means for reading out said auxiliary information from said image data; and output means for performing a process based on said auxiliary information with respect to said image data and outputting said image data.

In this case, said output means may be means for giving said auxiliary information to said image so that said auxiliary information can be recognized visually and outputting said image data.

Note that the information embedding method, auxiliary information reading method, and image output method according to the present invention may be provided by recording them on a computer readable recording medium as a program executable by a computer.

According the present invention, attention is paid to a quantization error that occurs when image data is converted from a first color space to a second color space, and auxiliary information is embedded into this quantization error. As a result, another piece of information differing from image data can be embedded into image data as auxiliary information.

Note that by embedding auxiliary information into a quantization error in a space where the quantization resolution of the first color space shrinks, the auxiliary information will not be visually recognized in reproducing image data, so that the auxiliary information can be concealed and embedded into the image data. In this case, by comparing an image represented by image data before color conversion with an image represented by image data embedded with auxiliary information, it is confirmed what color the color of a predetermined pixel in the image before color conversion has been converted to, whereby the auxiliary information can be read out.

Also, by embedding auxiliary information into a quantization error in a space where the quantization resolution of the first color space increases, a pixel having a predetermined color in an image represented by image data before color conversion is converted to a different color in an image represented by image data embedded with the auxiliary information, depending upon whether or not the auxiliary information is present. In this case, the auxiliary information can be embedded into the image data such that the auxiliary information is difficult to recognize visually, by arranging the color coordinate of the color of the conversion destination having the auxiliary information and the color coordinate of the color of the conversion destination having no auxiliary information such that the color coordinates are adjacent to each other.

DESCRIPTION OF THE PREFERRED EMBODIMENTS

Figure 1:
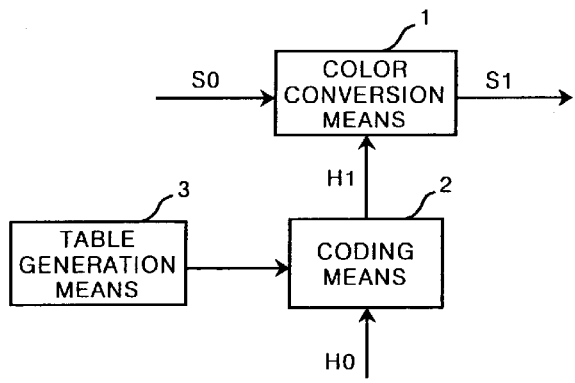
FIG. 1 is a schematic block diagram showing the construction of an information embedding apparatus according to a first embodiment of the present invention.

Embodiments of the present invention will hereinafter be described with reference to the drawings. FIG. 1 is a schematic block diagram showing the construction of an information embedding apparatus according to a first embodiment of the present invention. As shown in FIG. 1, the information embedding apparatus according to the first embodiment includes: color conversion means 1 for performing color conversion of image data S0, also embedding auxiliary information H1 coded as described infra, and for generating image data S1 embedded with the auxiliary information H1; coding means 2 for coding information H0 to be embedded and for obtaining coded auxiliary information H1; and table generation means 3 for generating a table for coding the information H0 in the coding means 2.

Note that as information H0 to be embedded in image data S0 in the embodiment of the present invention, copyright information of the image data S0, certified information, photographing conditions when the image data S0 was photographed, comments at the photographing time, a photographed date, lens information of a camera used in photographing, information about whether a stroboscope was used, information on a film kind and the like, a photographer's name, read conditions during reading if the image data S0 was read from film or a printed image, retrieval information of the image data S0 and the like are enumerated.

In the color conversion means 1, a color conversion table for embedding the auxiliary information H1 is generated based on a quantization error between a first color space to which the image data S0 belongs and a second color space which is a destination of conversion, and based on this table, color conversion of the image data S0 is performed.

Figure 2:
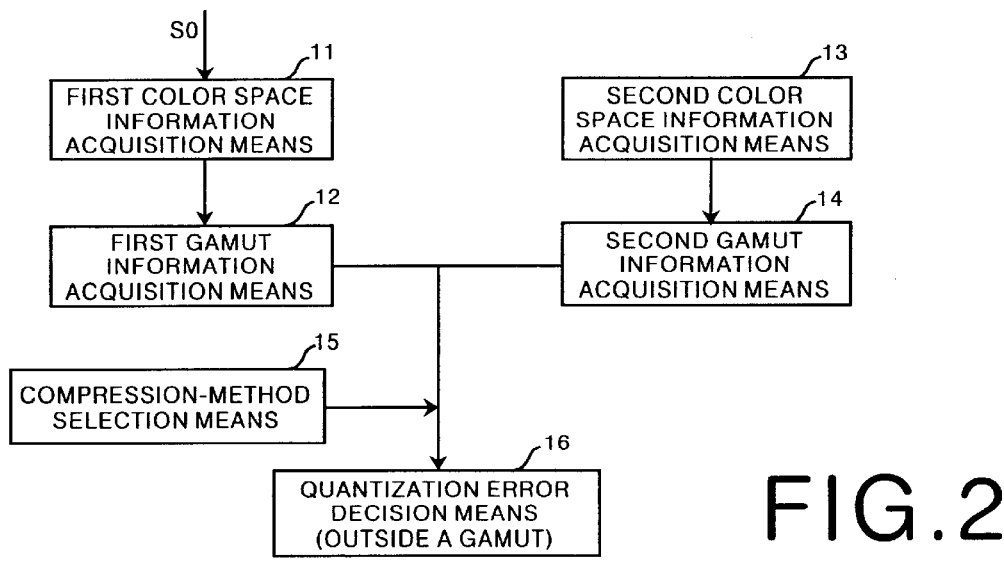
FIG. 2 is a schematic block diagram showing the construction of an apparatus for calculating a quantization error (outside gamut) in the information embedding apparatus.

FIG. 2 is a schematic block diagram showing the construction of an apparatus for calculating the quantization error between the first and second color spaces. As shown in FIG. 2, this apparatus includes: first color space information acquisition means 11 for acquiring color space information of the first color space that the image data S0 belongs to; first gamut information acquisition means 12 for acquiring gamut information representing the boundary of the first color space, based on the first color space information acquired by the first color space information acquisition means 11; second color space information acquisition means 13 for acquiring color space information of the second color space that is the conversion destination of the image data S0; second gamut information acquisition means 14 for acquiring gamut information representing the boundary of the second color space, based on the second color information acquired by the second color space information acquisition means 13; compression-method selection means 15 for selecting a method of compressing data that is outside the gamut, based on a difference between the gamut information of the first color space and the gamut information of the second color space; and quantization error decision means 16 for deciding a quantization error that is outside the gamut, based on both the method of compression selected by the compression-method selection means 15 and the gamut information of the first and second color spaces.

Figure 3:
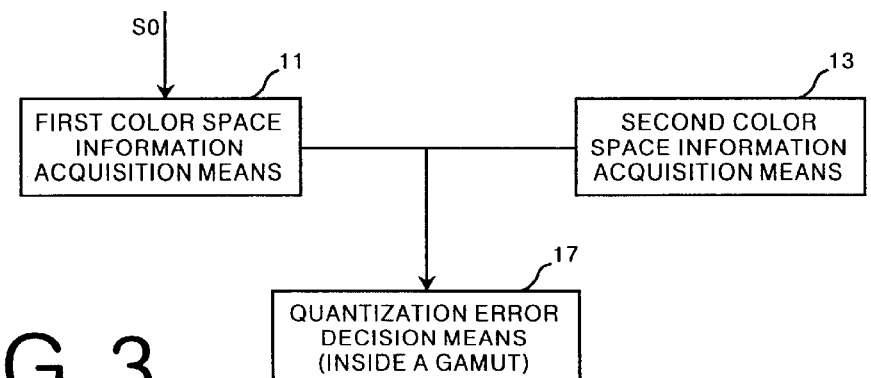
FIG. 3 is a schematic block diagram showing the construction of an apparatus for calculating a quantization error (inside gamut) in the information embedding apparatus.

On the other hand, a quantization error inside the gamut is calculated by an apparatus shown in FIG. 3. The apparatus shown in FIG. 3 includes: the first color space information acquisition means 11 shown in FIG. 2; the second color space information acquisition means 13 shown in FIG. 2; and quantization error decision means 17 for deciding a quantization error that occurs between color coordinates at the time of conversion because of a geometrical color coordinate difference inside the gamut, that is, a geometrical difference in array between the color coordinate of the first color space and the color coordinate of the second color space, based on the first and second color space information.

Figure 4:
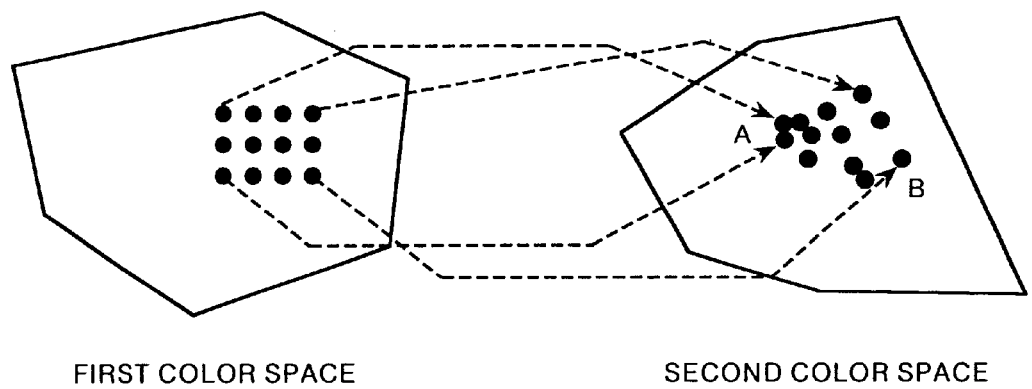
FIG. 4 is a diagram for describing a quantization error (one of the two)
Figure 5:
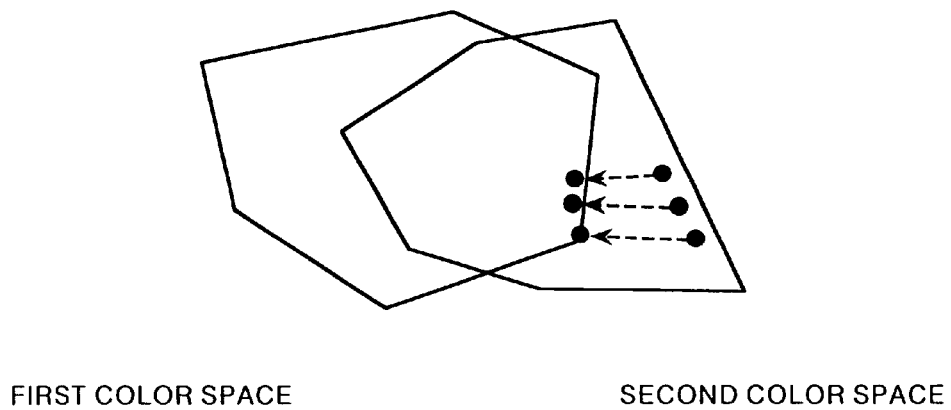
FIG. 5 is a diagram for describing a quantization error (another of the two)

Here, a description will be made of the quantization error based on the difference between the color spaces. FIGS. 4 and 5 are diagrams for describing the quantization error. If the color coordinates arranged regularly in the first color space are mapped onto the second color space, as shown in FIG. 4, methods of quantization will differ from each other because both color spaces differ in color reproducibility, and consequently, spatial distortion will occur. For instance, if a certain color coordinate in the first color space is mapped toward A in the second color space, the resolution will shrink and a shrinkage in the number of quantizations will arise. If, on the other hand, mapping is performed toward B, the resolution will be lost and an increase in the number of quantizations will arise. Thus, if a shrinkage and an increase in the number of quantizations arise, a quantization error will occur there.

Next, as shown in FIG. 5, consider the case of performing a conversion from the first color space to the second color space. As shown in FIG. 5, because of a difference in gamut (boundary as a color space) between the first and second color spaces, both a portion where the color spaces overlap and portions where they do not overlap will occur. Since the portion of the second color space protruding from the first color space (i.e., the portion outside the gamut) cannot be expressed in the first color space, there is a need to compress the protruding portion toward the center of the first color space. If the color space is compressed in this way, the second color space will lose an amount of information as a whole, so that a shrinkage in the number of quantizations will occur, resulting in a quantization error. Note that as a method of compressing a color space, not only the method of compressing a protruding portion toward the center of the first color space, but various methods, such as a method of compressing a protruding portion with greater force as it goes away from the first color space and a method of compressing a protruding portion, not in a central direction, but in a tangential direction with respect to a central axis, can be employed. And the above-mentioned compression-method selection means 15 shown in FIG. 2 selects this method of compressing data which is outside the gamut.

If one color space is thus converted to another color space whose color reproducibility is different from the one color space, a shrinkage or an increase in the number of quantizations will always arise because of a difference in the resolution of the quantization between color spaces, resulting in a quantization error. The present invention is directed to embedding auxiliary information H1 into an area where a quantization error will occur due to this shrinkage and increase in the number of quantizations. Here, in the present invention, two embedding methods are considered for each of the cases where the number of quantizations shrinks and increases.

Figure 6:
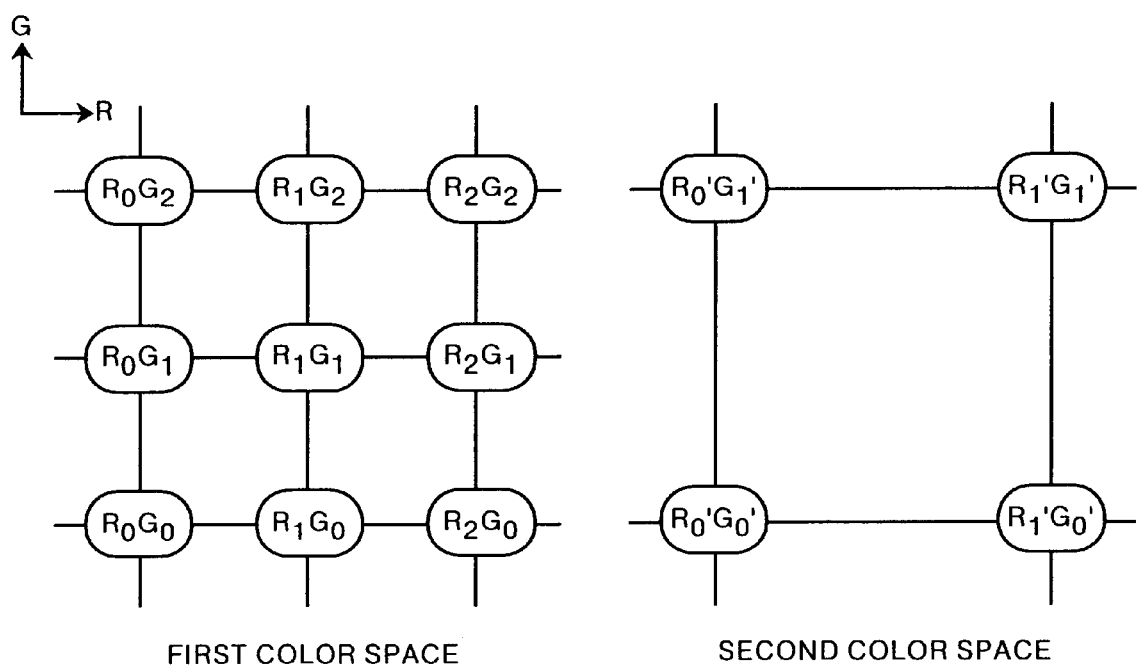
FIG. 6 is a diagram showing a model for describing embedment of auxiliary information into a quantization error area in the case where the number of quantizations shrinks.

First, a description will be made with relation to the case of embedding auxiliary information into a quantization error when the number of quantizations shrinks. FIG. 6 is a diagram showing a model for describing embedment of auxiliary information into a quantization error area in the case where the number of quantizations shrinks. Note that in FIG. 6, for the convenience of explanation, a three-dimensional RGB color space is shown two-dimensionally with the axis of abscissas as a R axis and the axis of ordinates as a G axis, a B axis in the direction perpendicular to the paper surface being omitted. Here, the first color space is, for example, a s-$R_oGB$ color space corresponding to a standard CRT monitor signal and the like, and in FIG. 6, a color area of three variation steps of the color coordinates of each of the RGB axes is shown in the RGB color space quantized to 8 bits (R, G, B=0~255). In FIG. 6, the R and G axes alone are shown, so this color area can take 9 colors consisting of color coordinates of $R_0G_0$, $R_0G_1$, $R_0G_2$, $R_1G_0$, $R_1G_1$, $R_1G_2$, $R_2G_0$, $R_2G_1$, and $R_2G_2$.

Also, the second color space is, for example, a color space corresponding to a printer exposure signal, and as with the first color space, a three-dimensional RGB color space is shown two-dimensionally with the axis of abscissas as a R axis and the axis of ordinates as a G axis, a B axis in the direction perpendicular to the paper surface being omitted. For the color area of the second color space equal in color to the color area of the first color space having 9 color coordinates of $R_0G_0$, $R_0G_1$, $R_0G_2$, $R_1G_0$, $R_1G_1$, $R_1G_2$, $R_2G_0$, $R_2G_1$, and $R_2G_2$, the first color space has three steps for each axis, but the second color space has only two steps for each axis, so that the resolution of the quantization is reduced. Thus, although the first color space has 9 color coordinates of $R_0G_0$, $R_0G_1$, $R_0G_2$, $R_1G_0$, $R_1G_1$, $R_1G_2$, $R_2G_0$, $R_2G_1$, and $R_2G_2$, in the second color space the 9 color coordinates become 4 color coordinates of $R'_0G'_0$, $R'_0G'_1$, $R'_1G'_0$, and $R'_1G'_1$, as shown in FIG. 6. Here, assume that the 4 color coordinates in the second color space are equal in color to the first color space for simplification. If it is also assumed that the step width in the first color space is incremented equally by a perceived color difference of $\Delta E=1$, the corresponding color area in the first and second color spaces shown in FIG. 6 becomes a rectangular color area whose magnitude of a side is $2\Delta E$.

Figure 7:
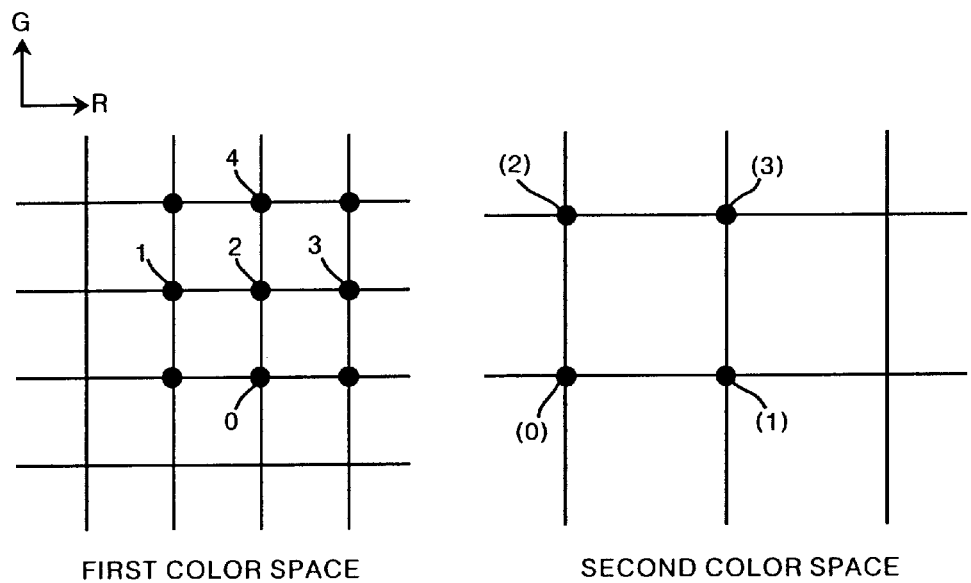
FIG. 7 is a diagram showing the state that, in the model shown in FIG. 6, numbers have been applied to color coordinates.

Here, the conversion from the first color space to the second color space becomes color conversion that 9 color coordinates shrink to 4 color coordinates; however, the 4 color coordinates corresponding to the corner portions of this color area are converted to corresponding color coordinates, respectively, because the first and second color spaces are equal in color. That is, the color coordinates $R_0G_0$, $R_0G_2$, $R_2G_0$, and $R_2G_2$ in the first color space are converted to the $R'_0G'_0$, $R'_0G'_1$, $R'_1G'_0$, and $R'_1G'_1$ in the second color space, respectively. On the other hand, the 5 color coordinates other than the corner portions in the first color space are converted to the second color space such that the color differences are as small as possible, respectively. Directing attention to these 5 color coordinates, a description will hereinafter be made. Note that for simplicity, numbers of 0, 1, 2, 3, and 4 are applied to the 5 color coordinates of $R_0G_1$, $R_1G_0$, $R_1G_1$, $R_1G_2$, and $R_2G_1$ in the first color space of FIG. 6, as shown in FIG. 7. Similarly, numbers of (0), (1), (2), and (3) are applied to the 4 color coordinates of $R'_0G'_0$, $R'_0G'_1$, $R'_1G'_0$, and $R'_1G'_1$ in the second color space.

Figure 8:
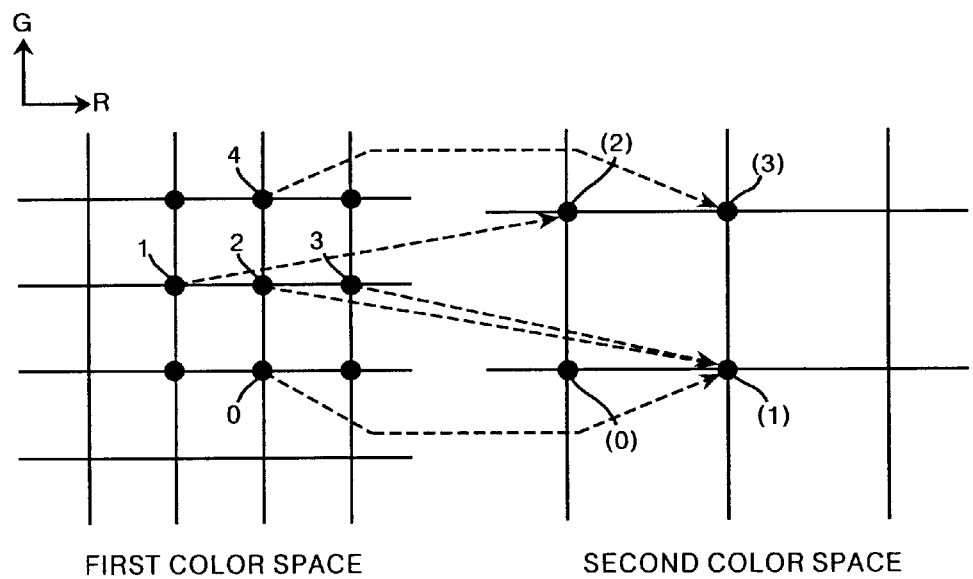
FIG. 8 is a diagram showing an embedment example of auxiliary information in actual conversion in the model shown in FIG. 6.

When the color coordinate 0 in the first color space is converted onto the second color space, the color coordinate 0 is converted to either the color coordinate (0) or (1) whose color difference $\Delta E$ becomes least before and after conversion. Also, when the color coordinate 2 in the first color space is converted onto the second color space, the color coordinate 2 is converted to any of the color coordinates (0), (1), (2), and (3), because the color difference $\Delta E$ before and after conversion is the same for each of the color coordinates (0), (1), (2), and (3). Thus, for the color coordinates 0, 1, 3, and 4 in the first color space, there are 2 degrees of freedom in the coordinate of the second color space of the conversion destination, so each coordinate can be made to have 1-bit information. Also, for the color coordinate 2 in the first color space, there are 4 degrees of freedom and therefore the color coordinate 2 can be made to have 2-bit information. These states are shown in Table 1. Therefore, it is possible to represent 6-bit information when conversion is performed from the first color space onto the second color space. For example, if the upper row of the color coordinates of the second color space is caused to correspond to 0 and the lower row to 1 in the case of the color coordinates 0, 1, 3, and 4 of the first color space in Table 1, as shown in Table 2 and if the top row is caused to correspond to 00, the second row to 01, the third row to 10, and the fourth row to 11 for the color coordinate 2 of the first color space in Table 1, as shown in Table 3, then 6-bit information "110101" is represented when color conversion is made like 0→(1), 1→(2), 2→(1), 3→(1), and 4→(3), as shown in FIG. 8.

TABLE 1

| Color coordinates in the first color space | 0 | 1 | 2 | 3 | 4 |
|---|---|---|---|---|---|
| Color coordinates in the second color space | (0) (1) | (0) (2) | (0) (1) (2) (3) | (1) (3) | (2) (3) |

TABLE 2

| Color coordinates in the first color space | 0 | 1 | 3 | 4 | | |
|---|---|---|---|---|---|---|
| Color coordinates in the second color space | (0)(1) | (0)(2) | (1)(3) | (2)(3) | 0 | 1 |

TABLE 3

| Color coordinate in the first color space | 2 | |
|---|---|---|
| Color coordinates in the second color space | (0) | 00 |
| | (1) | 01 |
| | (2) | 10 |
| | (3) | 11 |

In order to embed the information H0 into the image data S0, the information H0 is coded to a 6-bit value to obtain the coded auxiliary information H1 by referring to a table generated by the table generation means 3, and a color conversion table from the first color space onto the second color space, which corresponds to the code of the auxiliary information H1, is generated. For example, when the auxiliary information H1 coded to 6 bits is "110101," the color conversion table converts the image data S0 from the first color space to the second color space such that color coordinates are converted like 0→(1), 1→(2), 2→(1), 3→(1), and 4→(3), as shown in FIG. 8.

In this case, even if any information is assigned to the 6-bit value, the information will hardly be conspicuous, because the color difference ΔE between color coordinates before and after the conversion from the first color space to the second color space is $\Delta E \leq \sqrt{2}$ for all the color coordinates.

On the other hand, in order to read out the embedded auxiliary information H1, all that are required is to have: (1) image data S0 before color conversion; (2) a color conversion table representing a corresponding relationship between the first and second color spaces, equivalent to the above-mentioned Table 1; and (3) a table (table generated by the table generation means 3) representing a corresponding relationship between the coded auxiliary information H1 and the information H0. In this case, the positions of specific colors (here, colors at the color coordinates numbered 0, 1, 2, 3, and 4) on an image, represented by the image data S0 before color conversion, are calculated. These positions will correspond, on the image represented by the image data S1 after color conversion, to the positions at which the auxiliary information H1 is embedded. And at a position that a specific color before conversion is present, it is detected what color the color at this position has been converted to after color conversion, whereby a color coordinate corresponding to the converted color is calculated. And the 6-bit auxiliary information H1 can be read out by both the corresponding relationship between the color coordinate before conversion and the color coordinate after conversion and Table 1. Furthermore, by referring to the table that causes the auxiliary information H1 and the information H0 to correspond with each other, the information H0 can be obtained.

Note that although, in the above-mentioned embodiment, each color coordinate is caused to have bit information separately, it is also possible to cause the entire color area to have information in the following manner. For instance, in FIG. 7 the color coordinates 0, 2, 4 in the first color space cause color errors in the direction of R by a color conversion onto the second color space. If the sum total of the color errors in the R direction of these three color coordinates is assumed to be ΔEr, ΔEr can take 4 values: ΔEr=−3,−1, 1, and 3. For ΔEr=−1 and ΔEr=−1 of these values, 6 combinations can be taken as a method of converting color coordinates. For example, the case of ΔEr=−1 has the 6 following combinations:

[0→(0), 2→(0), 4→(3)]      (a)

[0→(0), 2→(2), 4→(3)]      (b)

[0→(0), 2→(1), 4→(2)]      (c)

[0→(0), 2→(3), 4→(2)]      (d)

[0→(1), 2→(0), 4→(2)]      (e)

[0→(1), 2→(2), 4→(2)]      (f)

In all these combinations, ΔEr is the same. Therefore, even if color conversion is performed by any of the combinations, a color difference could hardly be perceived on an image after conversion. Therefore, a difference in a perceived color becomes insignificant by using 6 combinations (a) to (f) as a code representing the auxiliary information H1, so it becomes possible to embed the auxiliary information H1 into the image data S0 in a manner that a color difference is more difficult to recognize visually. Note that in this case, the information H0 to be embedded is coded to any symbol of the above-mentioned 6 combinations (a) to (f) by the coding means 2, whereby the coded auxiliary information H1 is represented by any symbol of (a) to (f).

Furthermore, it is also possible to embed the auxiliary information H1 by employing a pair of combinations that 3 color coordinates in the conversion destination are all different, like the combinations (a) and (f) and combinations (b) and (e) in the above-mentioned combinations. For instance, combination (a) is caused to correspond to 1 and another combination (b) is caused to correspond to 0. And in embedding the auxiliary information H1 into the image data S0, color conversion employing a color conversion table that performs conversion like (a) is performed when the auxiliary information H1 coded to 1 is embedded and color conversion employing a color conversion table that performs conversion like (f) is performed when the auxiliary information H1 coded to 0 is embedded.

Also, when an image represented by the image data S0 is divided, for example, into three upper, intermediate, and lower image portions and information of 1 is embedded into the upper portion, information of 0 into the intermediate portion, and information of 1 into the lower portion, information can be embedded by switching color conversion tables, which perform conversion like (a) and (f), for each image area. In this case, even if conversion is performed by either color conversion table, there will be almost no color difference due to switching of color conversion tables at the boundary portion of each image area, because the sum total of errors ΔEr=−1. With this, it is possible to embed auxiliary information without being significantly recognized visually.

On the other hand, a method of embedding auxiliary information into a quantization error in the case where the number of quantizations increases will be described infra.

Now, a description will be made of the operation of the embodiment of the present invention.

First, in the first color space information acquisition means 11 shown in FIGS. 2 and 3, the color space information of the first color space that the image data S0 belongs to is acquired, and the color space information of the second color space which is the color space of the conversion destination is acquired in the second color space information acquisition means 13. Then, in the first and second gamut information means 12, 13 shown in FIG. 2, the gamut information of the first color space and the gamut information of the second color space are acquired based on the first and second color space information. On the other hand, in the compression-method selection means 15, a method of compressing a coordinate value in the second color space that is outside the gamut is selected, and in the quantization error decision means 16, a quantization error of a color coordinate outside the gamut, which occurs when conversion is performed, is calculated based on the selected method of compression and the first and second gamut information. On the other hand, in the quantization error decision means 17 shown in FIG. 3, a quantization error of a color coordinate inside the gamut, which occurs when conversion is performed, is calculated based on the first and second color space information.

Also, in the table generation means 3 shown in FIG. 1, a table for coding information H0 to be embedded is generated and in the coding means 2 the information H0 is coded by referring to this table, whereby auxiliary information H1 is obtained. On the other hand, in the color conversion means 1, a color conversion table, which represents which color coordinate of a conversion destination a color coordinate of the first color space is mapped onto, is generated in converting the image data S0 from the first color space to the second color space, as described supra. And in converting the image data S0 from the first color space to the second color space by the color conversion means 1, the coded auxiliary information H1 is embedded into the image data S0, whereby image data S1 embedded with the auxiliary information H1 is obtained.

Thus, when the auxiliary information H1 is embedded in a direction that the number of quantizations shrinks, the auxiliary information H1 is embedded as a quantization error into a portion having originally no resolution with respect to a color space. Therefore, even if the image data S1 is reproduced, information will become difficult to recognize visually after output, whereby the auxiliary information H1 can be concealed and embedded into image data. Note that in order to read out the auxiliary information H1 thus embedded, the color conversion table and the table, which was generated in the table generation means 3, are necessary as described supra. For this reason, only specified persons having these tables can know the contents of the information H0, whereby the concealment of the information H0 can be held.

Figure 9:
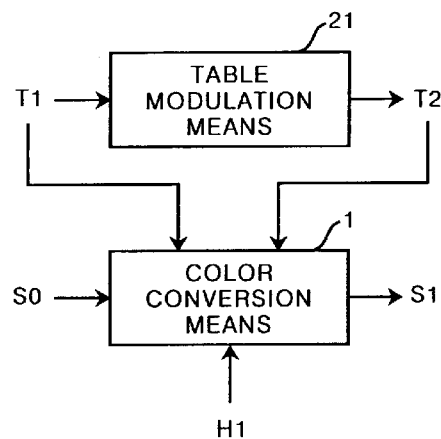
FIG. 9 is a schematic block diagram showing the construction of an information embedding apparatus according to a second embodiment of the present invention.

Next, a description will be made of a second embodiment of the present invention. FIG. 9 is a schematic block diagram showing the construction of an information embedding apparatus according to the second embodiment of the present invention. As shown in FIG. 9, the information embedding apparatus according to the second embodiment switches two kinds of color conversion tables T1 and T2 to embed auxiliary information H1 into image data S0 and generates image data S1 embedded with the auxiliary information H1, the apparatus including the same color conversion means 1 as the above-mentioned first embodiment and table modulation means 21 which modulates a first color conversion table T1 and generates a second color conversion table T2.

Figure 10:
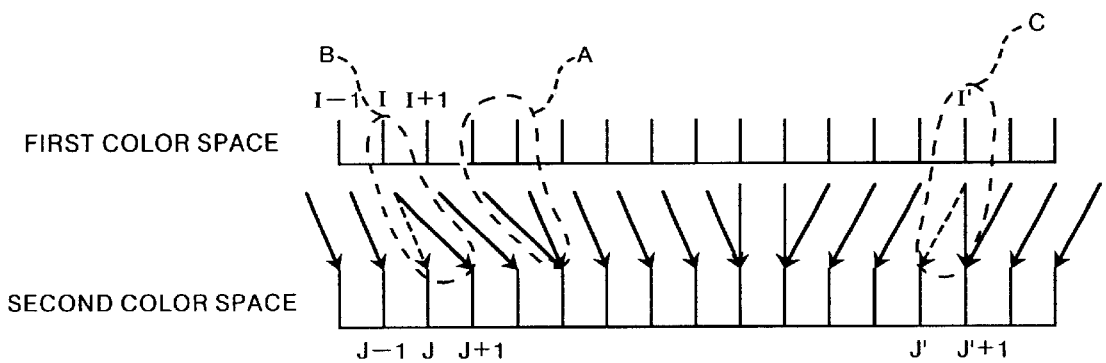
FIG. 10 is a diagram showing the state of conversion from a first color space onto a second color space.

The first color conversion table T1 converts a first color space, to which image data S0 belongs, to a second color conversion space and converts all color data, which the image data S0 can take in the first color space, to the second color space. Specifically, as shown in FIG. 10, each color coordinate in the first color space indicated in one dimension for convenience is converted as shown by solid arrows to a color coordinate indicated similarly in one dimension. Here, in color area A enclosed by a broken line in FIG. 10, quantization resolution has been shrunk by color conversion, and in the above-mentioned first embodiment, the auxiliary information H1 is embedded here. On the other hand, in color area B, quantization resolution has increased, and in the second embodiment, the auxiliary information H1 is embedded here.

That is, a pixel in image data, which becomes the pixel (value) of color coordinate J in the second color space shown in FIG. 10, is neither originally present in the second color space nor used when conversion is performed employing the first conversion table T1 although present. In the second embodiment, therefore, the color coordinate J is first calculated. When the color coordinate I in the first color space is converted by the first color conversion table T1, the first color conversion table T1 is modulated such that the color coordinate I is converted to the color coordinate J instead of being converted to the color coordinate J+1 in the second color space, whereby the second color conversion table T2 is obtained. The color conversion is performed switching the first and second color conversion tables T1, T2, whereby the auxiliary information H1 is embedded. Note that the color coordinate I selects one representing a color whose probability of appearance is relatively higher on an image represented by the image data S0.

Figure 11:
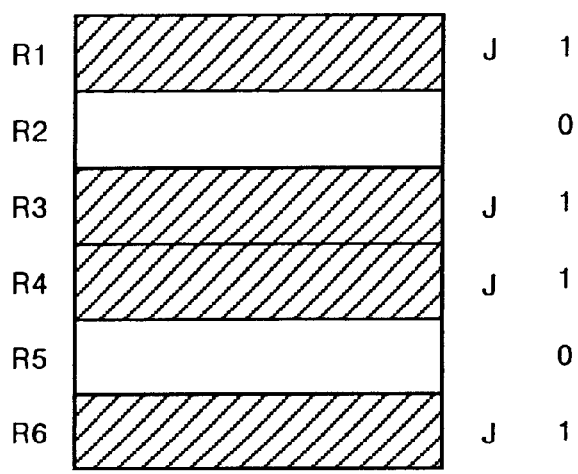
FIG. 11 is a diagram for describing a state of embedding auxiliary information.

The auxiliary information H1 is embedded into the image data S0 in the following manner. FIG. 11 is a diagram for describing the state that, in the second embodiment, the auxiliary information H1 is embedded. As shown in FIG. 11, when the image data S0 has, for example, 1024×1536 pixels, an image represented by the image data S0 is divided into 6 image areas R1 to R6 having 1024×256 pixels. In this case, assume that a pixel represented by the color coordinate I is present in all the image areas R1 to R6. And in performing color conversion of the image data S0, the first color conversion table T1 is used for the image areas R2, R5, while the second color conversion table T2 is used for the image areas R1, R3, R4, R6. With this, in the image data S1 after conversion, the color coordinate I in the image data S0 before color conversion is converted in the image areas R2, R5 to the color coordinate J+1 and in the image areas R1, R3, R4, R6 to the color coordinate J. Therefore, if it is assumed that the case where the color coordinate J appears on an image represented by the image data S1 is 1 and that the case where the color coordinate J+1 appears is 0 and if it is detected for each of the image areas R1 to R6 whether or not the color coordinates J, J+1 are present, then 6-bit information can be embedded. Also, in the second color space the color coordinate J and the color coordinate J+1 are less than 1 quantization step, so a difference in color can hardly be recognized visually at the boundary portions of the image areas R1 to R6. Therefore, the auxiliary information H1 can be embedded without substantially degrading picture quality, compared with the case where the image data S0 is converted by the first color conversion table T1 alone. Note that in the embodiment of the present invention, auxiliary information H1 of "101101" is embedded as shown in FIG. 11.

Notice that in order to read out the auxiliary information H1, whether or not the color coordinate J and the color coordinate J+1 are present is detected for each of the above-mentioned 6 image areas R1 to R6 of the image represented by the image data S1, whereby the auxiliary information H1 is calculated. By referring to the table (generated by the table generation means 3 of the first embodiment) causing the auxiliary information H1 and the information H0 to correspond to each other, the information H0 can be obtained. Therefore, unlike the first embodiment, the auxiliary information H1 can be read out without employing the image data S0 before color conversion. Note that in this case, the color coordinate J and the color coordinate J+1 are difficult to recognize visually because, in the second color space, they are less than 1 quantization step; however, a difference between the color coordinate J and the color coordinate J+1 can be detected as a digital value of the image data S1, because there is a difference in digital value therebetween.

In the case where the auxiliary information H1 is embedded in a direction that the number of quantizations increases, as in this second embodiment, the auxiliary information H1 can be embedded into the image data S0 without substantially degrading picture quality, compared with the case where color conversion is performed by employing the first color conversion table T1 alone, by embedding the auxiliary information H1 in accordance with whether the color coordinate I in the first color space is converted to the color coordinate J or color coordinate J+1 in the second color space, using the first and second color conversion tables T1, T2. In addition, even in the case of reading out auxiliary information H1, all that is required is to detect whether or not the color coordinate J and the color coordinate J+1 are present and therefore the image data S0 before color conversion becomes unnecessary, whereby detection of the auxiliary information H1 can easily be performed.

Note that although, in the above-mentioned second embodiment, auxiliary information H1 has been embedded by switching whether the color coordinate I in the first color space is converted to the color coordinate J or J+1 in the second color space, the auxiliary information H1 may be embedded by switching whether the color coordinate I−1 or I+1 adjacent to the color coordinate I in the first color space is converted to the color coordinate J or J+1 in the second color space. In this case, although picture quality is slightly degraded due to a large difference in color as compared with the case of converting the color coordinate I to the color coordinate J or J+1, the auxiliary information H1 can be embedded into the image data S0 in the same manner as the second embodiment.

In addition, in the case where, like the color coordinate J of the second color space shown in FIG. 10, a plurality of color coordinates, which are not used when conversion is performed by employing the first color conversion table T1, are present in the first color space, color conversion of the plurality of color coordinates can also be performed by using a color conversion table modulated on the basis of the same auxiliary information, and in reading out the auxiliary information, the logical OR between a plurality of results read out can be used. With this, the probability that information embeddable color coordinates are present in divided image areas can be enhanced.

Figure 12:
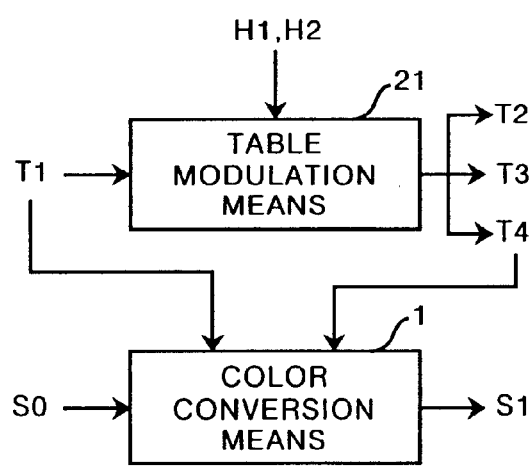
FIG. 12 is a schematic block diagram showing the construction of an information embedding apparatus according to a third embodiment of the present invention.

Next, a description will be made of a third embodiment of the present invention. FIG. 12 is a schematic block diagram showing the construction of an information embedding apparatus according to the third embodiment of the present invention. As shown in FIG. 12, the information embedding apparatus according to the third embodiment of the present invention uses two kinds of pieces of auxiliary information H1, H2 separately representing two kinds of pieces of information H0, H0', such as information about a photographed date and information about a photographer of image data S0; generates third and fourth color conversion tables T3, T4 in addition to the second color conversion table T2; selects one color conversion table from the second color conversion table T2, third color conversion table T3, and fourth color conversion table T4 in accordance with the two kinds of pieces of auxiliary information H1, H2; and selectively embeds the two pieces of auxiliary information H1, H2 into the image data S0.

That is, in the above-mentioned second embodiment, auxiliary information H1 has been embedded into image data S0 by switching the color coordinate I in the first color space to either the color coordinate J or color coordinate J+1 in the second color space. Similarly, in color area C shown in FIG. 10, information can be embedded by switching the color coordinate I' in the first color space to either the color coordinate J' or color coordinate J'+1 in the second color space. In the third embodiment, therefore, a second color conversion table T2 similar to the above-mentioned second embodiment is generated so that two kinds of pieces of information can be embedded. Also, when the color conversion I' is converted by the first color conversion table T1, the first color conversion table T1 is modulated such that the color conversion I' is converted to the color conversion J' instead of being converted to the color coordinate J'+1 in the second color space, whereby the third color conversion table T3 is generated. Note that it is assumed that in the second color conversion table T2, the color coordinate I' in the first color space is converted to the color coordinate J'+1 in the second color space in the same way as the first color conversion table T1, and in the third color conversion table T3, the color coordinate I in the first color space is converted to the color coordinate J+1 in the second color space in the same way as the first color conversion table T1. Also, assume that in the fourth color conversion table T4, the color coordinate I in the first color space is converted to the color coordinate J in the second color space and the color coordinate I' in the first color space to the color coordinate J' in the second color space.

And by dividing an image represented by the image data S0 into 6 image areas in the same manner as the above-mentioned second embodiment and then switching the first color conversion table T1 and the second color conversion table T2 for each image area and thereby converting the image data S0 to the image data S1, auxiliary information H1 can be embedded into the image data S0. On the other hand, by switching the first color conversion table T1 and the third color conversion table T3 for each image area and thereby converting the image data S0 to the image data S1, the auxiliary information H2 can be embedded into the image data S0. The second color conversion table T2 and the third color conversion table T3 are switched according to which of the two pieces of auxiliary information H1, H2 is input to the table modulation means 21.

On the other hand, embedding the auxiliary information H1 and auxiliary information H2 simultaneously is also possible. That is, by dividing an image represented by image data S0 into 6 image areas in the same manner as the above-mentioned second embodiment and then switching the first through the fourth color conversion tables T1, T2, T3, T4 for each image area and thereby converting the image data S0 to the image data S1, the auxiliary information H1 and auxiliary information H2 can be embedded into the image data S0. In this case, the contents of the auxiliary information H1 and auxiliary information H2 are decided for each image area, and when, for example, in a certain image area, the auxiliary information H1 is 0 and the auxiliary information H2 is 0, the first color conversion table T1 is used. When the auxiliary information H1 is 1 and the auxiliary information H2 is 0, the second color conversion table T2 is used. When the auxiliary information H1 is 0 and the auxiliary information H2 is 1, the third color conversion table T3 is used. When the auxiliary information H1 is 1 and the auxiliary information H2 is 1, the fourth color conversion table T4 is used. With this, the image data S0 is converted to the image data S1, whereby the auxiliary information H1 and the auxiliary information H2 can be embedded into the image data S0. Notice that the firth through the fourth color conversion tables T1, T2, T3, T4 are switched according to the contents of the auxiliary information H1 and auxiliary information H2 input to the table modulation means 21.

Note that while, in this embodiment, two pieces of information H1, H2 have been embedded using the first through the fourth color conversion tables T1 to T4, it is also possible to embed the information H1 and the information H2 by using two tables. This means, for example, to embed the information H1 and information H2 into different color coordinates by using the first and fourth color conversion tables T1, T4. And in performing color conversion for each pixel within each image area, it is decided whether the color coordinate is color coordinate I or I' or the other color coordinate. If it is the color coordinate I, the content of the auxiliary information H1 in the area is decided. If it is 1, the fourth color conversion table T4 is used for the pixel. If it is 0, the first color conversion table is used. On the other hand, if the color coordinate is color coordinate I', the content of the auxiliary information H2 is decided instead of the auxiliary information H1. If it is 1, the fourth color conversion table T4 is used for the pixel, and if it is 0, the first color conversion table is used. Note that when the color coordinate is neither color coordinate I or color coordinate I', either of the first and fourth color conversion tables T1, T4 may be used, but if the table used in the immediately prior conversion is used as it is, this will be desirable from the standpoint of a speed of calculation. And by switching the first and fourth color conversion tables T1, T4 in accordance with a color coordinate in this manner, a plurality of pieces of information can be embedded into different color coordinates.

Note that in order to detect the embedded auxiliary information H1 and auxiliary information H2, whether or not the color coordinates J, J+1 are present is detected for each of the image areas corresponding to the above-mentioned 6 image areas of the image represented by the image data S1, whereby the auxiliary information H1 can be calculated the same as the above-mentioned second embodiment. Also, if it is detected whether or not the color coordinates J', J'+1 are present, the auxiliary information H2 can be calculated.

Note that although, in the above-mentioned third embodiment, two pieces of information H1, H2 have been embedded into the image data S0, a plurality of color areas, where the number of quantizations increases like the color areas B and C shown in FIG. 10 in performing color conversion from the first color space to the second color space, are also present elsewhere. Therefore, by generating a color conversion table, which makes the conversion destination of a color coordinate in the first color space different from the first color conversion table T1, for each of such color areas, a greater number of pieces of auxiliary information can be embedded into the image data S0 selectively.

Figure 13:
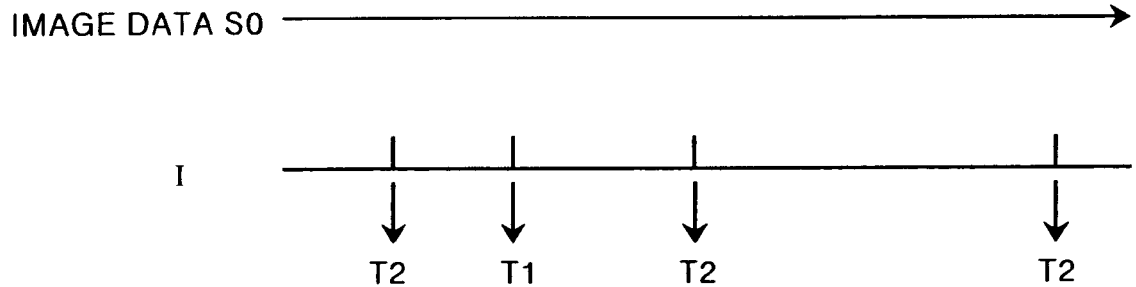
FIG. 13 is a diagram for describing an information embedding state in a fourth embodiment of the present invention.

In addition, although, in the above-mentioned second and third embodiments, auxiliary information has been embedded by dividing an image represented by the image data S0 into a plurality of image areas and switching a color conversion table to be used for each of the image areas, it is also possible to embed the auxiliary information at the pixel positions of the image represented by the image data S0. This will hereinafter be described as a fourth embodiment. FIG. 13 is a diagram for describing the process that is performed in the fourth embodiment. In the fourth embodiment, the image data S0 is scanned in a raster fashion to perform color conversion for each pixel, and in the middle of the color conversion by this raster scan, the first and second color conversion tables T1, T2 are switched the same as the second embodiment, each time the color coordinate I in the first color space appears. In this way, auxiliary information H1 is embedded. Note that it is assumed that in this embodiment, auxiliary information H1 of "1011" is embedded.

First, the image data S0 is scanned in a raster fashion from its initial pixel position (e.g., the coordinate value of a pixel, (0, 0)). As shown in FIG. 13, until the color coordinate I in the first color space appears, color conversion is performed for the data values of all pixels by the first color conversion table T1, and for the color coordinate I that appears first, color conversion is performed by the second color conversion table T2. Hereinafter, for the color coordinate I that appears second, color conversion is performed by the first color conversion table T1, and for the color coordinates I that appear third and fourth, color conversion is performed by the second color conversion table T2. And after the 4 color coordinates I have appeared, color conversion is performed for all the remaining pixel data values by employing the first color conversion table T1, whereby image data S1 embedded with the auxiliary information H1 is obtained. Note that in this case, there is a need to prescribe the number of information bits to be embedded previously.

Figure 14:
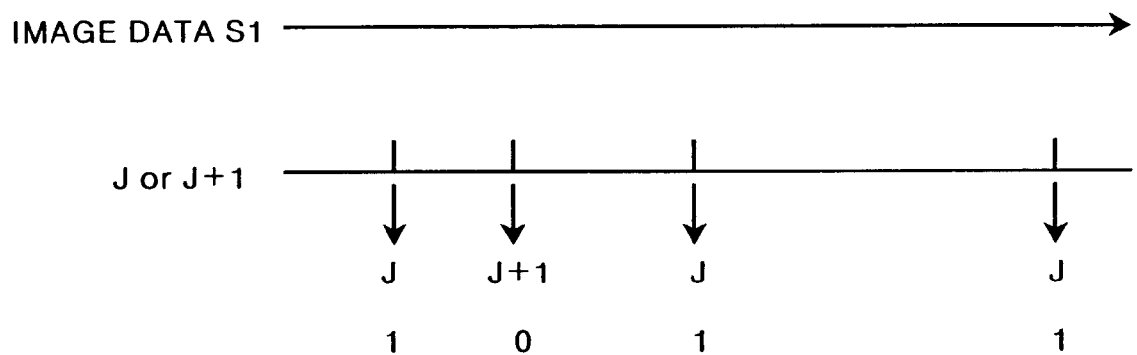
FIG. 14 is a diagram for describing an information reading state in the fourth embodiment of the present invention.

In order to read out the auxiliary information H1 embedded in this way, the image data S1 is scanned in a raster fashion from its initial position, whereby the states of appearance of the color coordinate J and color coordinate J+1 in the second color space are detected at a position corresponding to the color coordinate I in the image data S0. In this case, the color coordinate J and the color coordinate J+1 appear in the order of J, J+1, J, and J, as shown in FIG. 14. Therefore, if the color coordinate J is caused to correspond to 1 and the color coordinate J+1 to 0, the auxiliary information H1 of "1011" can be read out. Note that in this case, a position corresponding to the color coordinate I is necessary on an image represented by the image data S1, so the image data S0 before color conversion becomes necessary for reading out the auxiliary information H1. And by referring to the table that causes the read auxiliary information H1 to correspond to auxiliary information H1 and information H0, the information H0 can be obtained.

Figure 15:
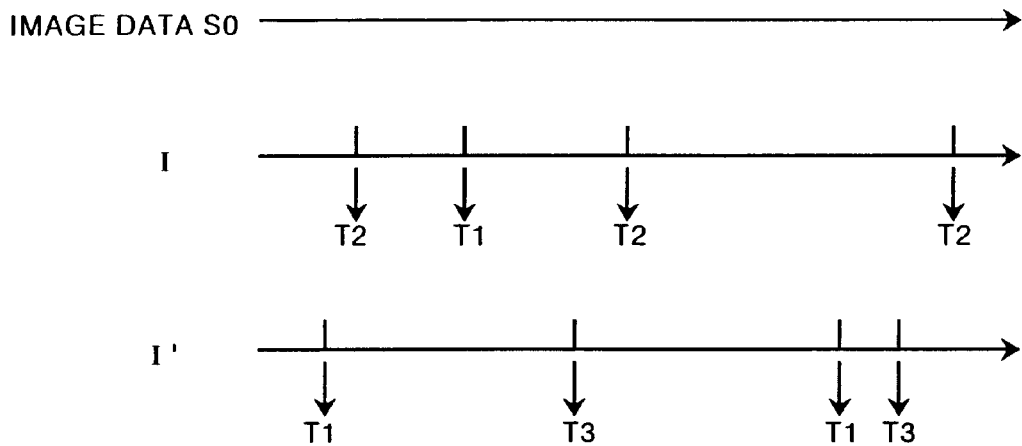
FIG. 15 is a diagram for describing an information embedding state in a fifth embodiment of the present invention.

Note that when auxiliary information H1 is embedded as indicated in the fourth embodiment, it is also possible to simultaneously embed a plurality of pieces of auxiliary information into image data S0. This will hereinafter be described as a fifth embodiment. FIG. 15 is a diagram for describing the process that is performed in the fifth embodiment. Note that it is assumed that in the fifth embodiment, two pieces of auxiliary information H1, H2 are embedded the same as the third embodiment. The fifth embodiment scans image data S0 in a raster fashion in the same manner as the fourth embodiment and, in the middle of this scan, switches the first color conversion table T1 and the second color conversion table T2 in the same manner as the second embodiment each time the color coordinate I in the first color space appears, thereby embedding the auxiliary information H1. Furthermore, the fifth embodiment switches the first color conversion table T1 to the third color conversion table T3 in the above-mentioned third embodiment every time the color coordinate I' in the first color space appears, thereby embedding the auxiliary information H2. Note that it is assumed that in this embodiment, auxiliary information H1 of "1011" and auxiliary information H2 of "0101" are embedded.

First, as shown in FIG. 15, until the color coordinate I in the first color space appears, color conversion is performed for the data values of all pixels by the first color conversion table T1, and for the color coordinate I that appears first, color conversion is performed by the second color conversion table T2. Hereinafter, for the color coordinate I that appears second, color conversion is performed by the first color conversion table T1, and for the color coordinates I that appear third and fourth, color conversion is performed by the second color conversion table T2. On the other hand, for the color coordinate I' that appears first, color conversion is performed by the first color conversion table T1. Hereinafter, for the color coordinate I' that appears second, color conversion is performed by the third color conversion table T3, and for the color coordinates I' that appear third and fourth, color conversion is performed by the first and third color conversion tables T1, T3. And after the 4 color coordinates I and the 4 color coordinates I' have appeared, color conversion is performed for all the remaining pixel data values by employing the first color conversion table T1, whereby image data S1 embedded with the auxiliary information H1, H2 is obtained. Note that in the fifth embodiment, there is also a need to prescribe the number of information bits to be embedded previously, as in the fourth embodiment.

Figure 16:
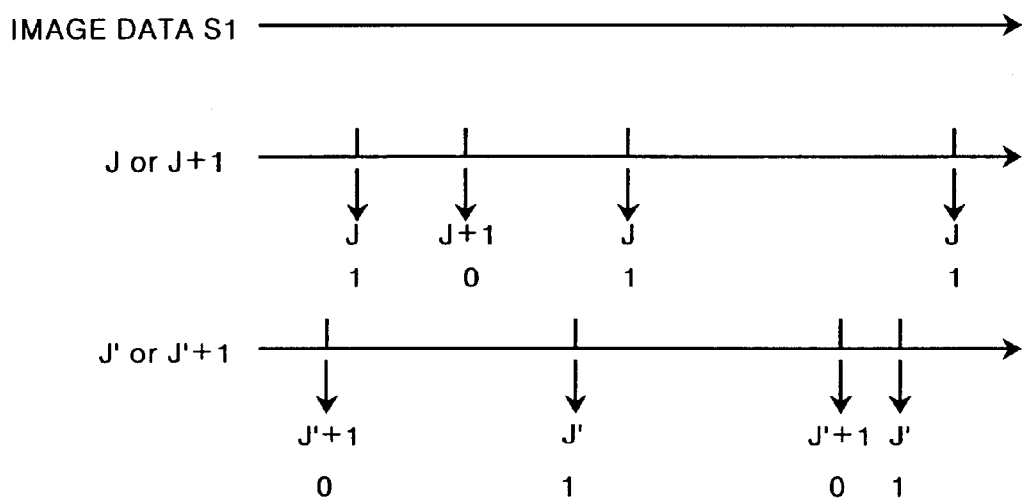
FIG. 16 is a diagram for describing an information reading state in the fifth embodiment of the present invention.

In order to read out the auxiliary information H1 and the auxiliary information H2 embedded in this way, the auxiliary information H1 of "1011" is first read out in the same manner as the above-mentioned fourth embodiment. Thereafter, the image data S1 is scanned in a raster fashion from its initial position, whereby the states of appearance of the color coordinate J' and color coordinate J'+1 in the second color space are detected at a position corresponding to the color coordinate I' in the image data S0. In this case, the color coordinate J' and the color coordinate J'+1 appear in the order of J'+1, J', J'+1, and J', as shown in FIG. 16. Therefore, if the color coordinate J' is caused to correspond to 1 and the color coordinate J'+1 to 0, the auxiliary information H2 of "0101" can be read out. And by referring to the table that causes the read auxiliary information H1 and auxiliary information H2 to correspond to two pieces of auxiliary information H1, H2 and to two pieces of information H0, H0' to be embedded, the information H0, H0' can be obtained.

Thus, in the fifth embodiment, it is possible to embed a plurality of different pieces of information H1, H2 into a single image data S0. Also, while different auxiliary information can be embedded for each color coordinate, the auxiliary information cannot be read out if the color coordinate used in embedding the auxiliary information is not known. For this reason, different readable auxiliary information can be read out according to whether or not there is information about a color coordinate used in embedding auxiliary information. Therefore, it becomes possible to restrict accessible auxiliary information for each user, by restricting information about a color coordinate that is made known in accordance with users of image data S1. Furthermore, new auxiliary information can be embedded without deleting auxiliary information that has already been embedded, by employing a new color conversion table that converts a color coordinate differing from embedded auxiliary information.

Figure 17:
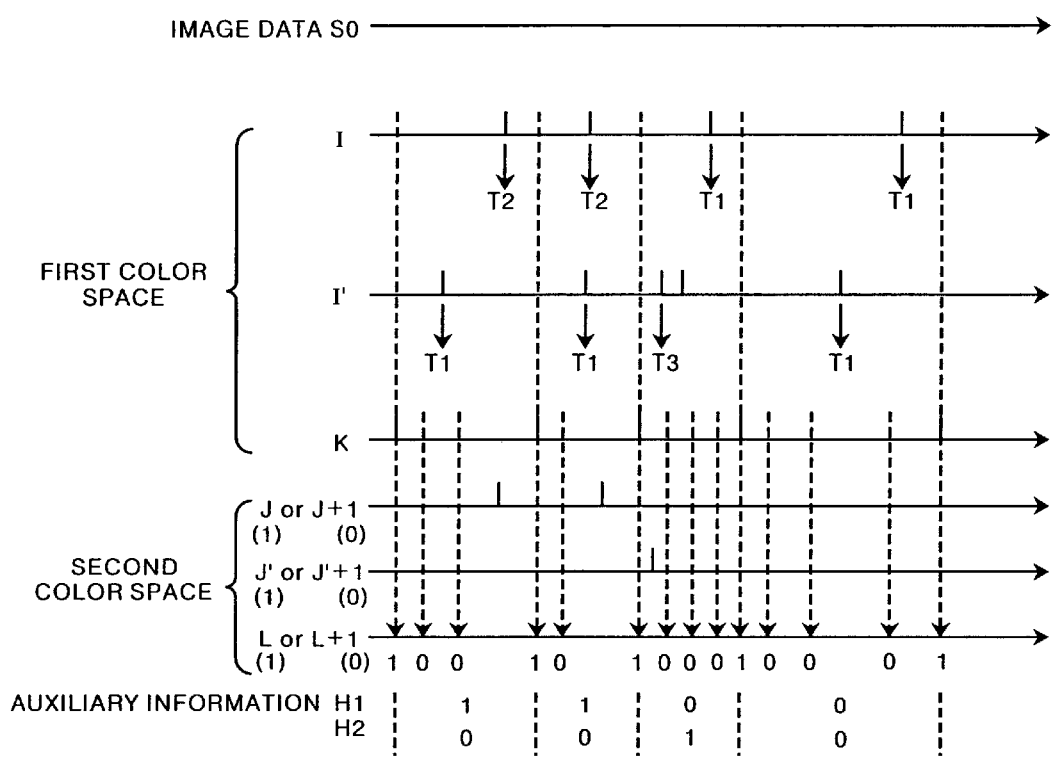
FIG. 17 is a diagram for describing an information embedding state and an information reading state in a sixth embodiment of the present invention.

Note that although, in the above-mentioned fifth embodiment, the image data S0 before color conversion has been employed to specify a position at which information has been embedded, an information embedded position can be specified without using the image data S0 by employing a color coordinate K, whose frequency of appearance is relatively high, as a synchronous signal for specifying an information embedded position, when auxiliary information H1 and auxiliary information H2 are embedded, as shown in FIG. 17. This means that the color coordinate K in the first color space is converted to the color coordinate L+1 in the second color space when no information is embedded and to the color coordinate L in the second color space when information is embedded, and renders it possible to specify an information embedded position without using image data S0 before color conversion, by detecting the state of appearance of the color coordinate L in the second color space after information embedment which corresponds to the color coordinate K in the first color space used as a synchronous signal in reading out embedded information. This will be described as a sixth embodiment.

In performing embedment of information at the time of color conversion of an image, image data S0 is scanned in a raster fashion from its initial position. When color coordinate K appears first, the color coordinate K is converted to the color coordinate L in the second color space by employing a color conversion table that performs embedment of information with respect to the color coordinate K. Thereafter, when color coordinate I and color coordinate I' appear, the data value of a pixel is converted by switching whether the first color conversion table T1 is used and whether the second and third color conversion tables T2, T3 are used, in accordance with the contents of auxiliary information H1 and auxiliary information H2. And in the case where the color coordinates I and I' have both appeared during a period from appearance of the first color coordinate K to appearance of the second color coordinate K, when the second color coordinate K appears, the color coordinate K is converted to the color coordinate L in the second color space by a color conversion table that performs embedment of information. Also, when neither of the color coordinates I, I' appear, the color coordinate K is converted to the color coordinate L+1 in the second color space by a color conversion table that performs no embedment of information. Similarly, for the color coordinates K that appear third and thereafter, whether or not both of the color coordinates I, I' have appeared is judged and the color coordinates K are converted to the color coordinates L, L+1 in the second color space by using the color conversion table that performs embedment of information when both have already appeared and the color conversion table that performs no embedment of information when neither has appeared.

When image data S1 after color conversion is scanned in a raster fashion from its initial position, by performing color conversion in this manner, the color coordinate I and color coordinate I' in the image data S0 before color conversion appear at least once during an interval from the appearance of color coordinate L to the appearance of the next color coordinate L. Therefore, this interval between the color coordinate L and the color coordinate L is used as an interval that 1-bit information is embedded, and when the color coordinate I and the color coordinate I' appear, the data value of a pixel is converted by switching color conversion tables. And in the case where the color coordinate I and color coordinate I' appear in the appearance interval of the color coordinate L in the second color space until the fifth color coordinate L appears in the image data S1 after color conversion, when a synchronous signal such as the aforementioned is embedded, auxiliary information H1 of "1100" and auxiliary information H2 of "0010" can be embedded as shown in FIG. 17 by switching color conversion tables.

Note that although, in the sixth embodiment, there are cases where a plurality of color coordinates I and color coordinates I' appear in the appearance interval of the color coordinate L in the second color space, information can be embedded without confusion by previously setting a rule that information is embedded only for the color coordinates I, I' that appear first. Also, there are cases where the color coordinates I, I' do not appear at all in the appearance interval of the color coordinate K. In this case, until the color coordinate I and color coordinate I' appear, color coordinate K is not used as a synchronous signal, even if the color coordinate K is detected. Therefore, information can be embedded without confusion.

Note that although, in the above-mentioned fourth through the sixth embodiments, the position of starting raster scan of image data S0, S1 employs, for example, the position at which the coordinate of a pixel is (0, 0), the present invention is not to be limited to this, but raster scan may be started from an arbitrary pixel position.

Figure 18:
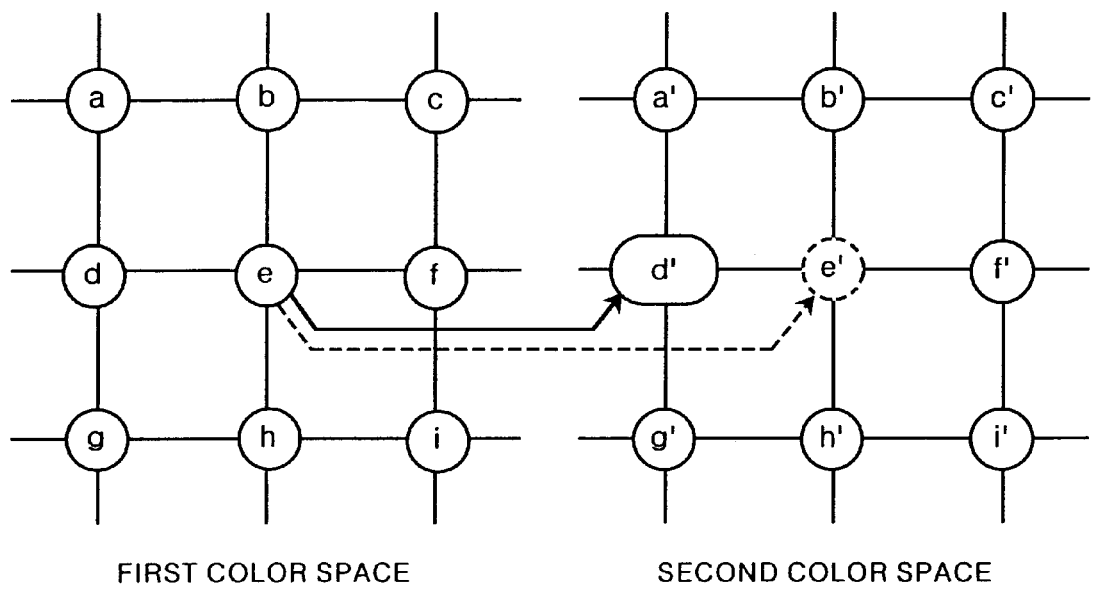
FIG. 18 is a diagram for describing a method of coping with the case that color coordinates in a conversion destination cannot be ensured.

Note that although, in the above-mentioned second through the sixth embodiments, auxiliary information is embedded into a space, where the number of quantizations increases, for example, by employing a color not used in the second color space, there are cases where sufficient color coordinates in a destination of conversion cannot be ensured to embed auxiliary information, depending upon properties of the first and second color spaces. In this case, color coordinates in a destination of conversion are ensured in the following manner. FIG. 18 is a diagram for describing a method of coping with the case where color coordinates in a destination of conversion cannot be ensured. First, in the second color space, color coordinate e' into which information is embedded is predetermined, and color coordinate e in the first color space, which is converted to this color coordinate e' at the time of color conversion, is calculated. And, two color conversion tables, a color conversion table which converts the color coordinate e in this first color space to the color coordinate e' in the second color space as shown by a broken line in FIG. 18 and a color conversion table which converts the color coordinate e in this first color space to color coordinated d' adjacent to the color coordinate e' in the second color space as shown by a solid line in FIG. 18, are generated. And when color conversion of the image data S0 is performed, auxiliary information can be embedded into image data S0 in accordance with which of these two color conversion tables is used.

That is, 1-bit information can be embedded, by performing color conversion of the image data S0 in the same manner as the above-mentioned second through the sixth embodiments with the color conversion table, which converts the color coordinate e in the first color space to the color coordinate e' in the second color space, as the first color conversion table T1 and with the color conversion table, which converts the color coordinate e in the first color space to the color coordinate d' adjacent to the color coordinate e' in the second color space, as the second color conversion table T2 and also by whether a position on the image data S1 after conversion that corresponds to the image data S0 before conversion has become the color coordinate d' or the color coordinate e'. Therefore, auxiliary information can be embedded into the image data S0, by switching tables to be used in color conversion in the same manner as the above-mentioned second through the sixth embodiments.

Figure 19:
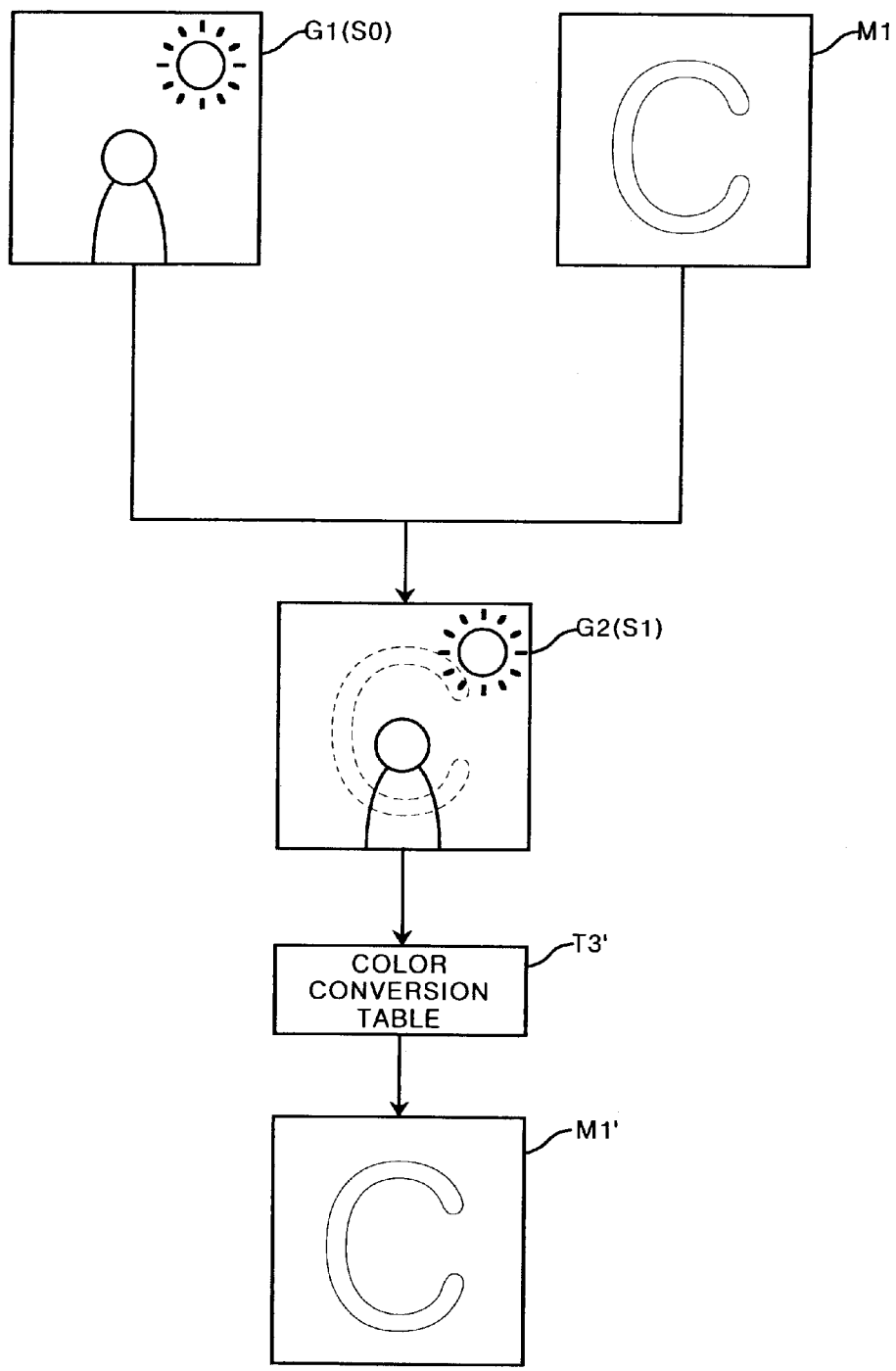
FIG. 19 is a diagram showing the process that is performed in a seventh embodiment of the present invention.

Note that while, in the above-mentioned second through the sixth embodiments, coded auxiliary information Hi is embedded into the image data S0, it is also possible to embed auxiliary information H1 in pattern form. Embedment of the auxiliary information H1 in pattern form will hereinafter be described as a seventh embodiment. FIG. 19 is a diagram showing the process that is performed in the seventh embodiment. As shown in FIG. 19, in the seventh embodiment, in converting image G1 represented by image data S0 from the first color space, to which the image G1 belongs, to the second color space, character image M1 with a character pattern of "C" is embedded as auxiliary information H1 in pattern form. Note that the character image M1 has the same number of pixels as the image G1; the character pattern of "C" in the character image M1 has line width sufficiently; and the image data representing this character image M1 is binary data having a value of 1 for its character pattern portion and a value of 0 for its background portion. Also, assume that in the seventh embodiment, a color conversion table that is normally used in converting the image G1 to the second color space is the first color conversion table T1 and a color conversion table that is used to embed the auxiliary information H1 is the second color conversion table T2.

And in converting the image G1 from the first color space to the second color space, auxiliary information H1 is embedded at pixel positions on the image G corresponding to the color coordinates I, I' in the first color space shown in FIG. 10. That is, in converting the image data S0 representing the image G1 from the fist color space to the second color space, the auxiliary information H1 is embedded in pattern form into a color coordinate that is neither present in the second color space nor used when conversion is performed with the first conversion table T1 although present (hereinafter referred to as a hole color coordinate in this embodiment).

Here, if it is assumed that the color data of one color of the three-dimensional RGB image data has a gradation of 8 bits, it can be sufficiently supposed that hole color coordinates of approximately 10 percent appear, when this color data is converted onto a color space differing from the color space that the color data belongs to. Here, if it is assumed that hole color coordinates of 10 percent appear at the time of color conversion, hole color coordinates of 27% $(1-0.9^3)$ will appear in the three-dimensional RGB color space by simple calculation. Also, in a case such that image data has a gradation of 16 bits for each color, the probability that hole color coordinates appear becomes higher. On the other hand, assume that the image G1 has 1000×1000 pixels, when auxiliary information H1 is embedded in pattern form. If, in such a case, there are about 100×100 pixels that can be embedded, it will be enough to express one character, even if these pixels are present at random on the image. That is, if pixels of one-hundredth of the total pixels of the image G1 become hole color coordinates, the auxiliary information H1 can be embedded in pattern form sufficiently. Here, from the fact that, in the above-mentioned calculation, hole color coordinates of about 27% appear in a single image G1, it becomes possible to reliably embed the auxiliary information H1 in pattern form.

Specifically, each pixel position of the image G1 and each pixel position of the character image M1 are caused to correspond to each other, and for pixel positions at which character patter portions with a value of 1 on the character image M1 overlap each other, color conversion is performed using the second color conversion table T2. As a result, when hole color coordinates are present at the overlapping pixel positions on the image G1, the hole color coordinates are converted by the second color table 2, whereby a color after conversion appears. And for the other pixel positions, color conversion is performed using the first color conversion table T1. With a color after conversion, the auxiliary information H1 is embedded in pattern form into the image G1, whereby image data S1 representing image G2 embedded with the auxiliary information H1 can be obtained as shown in FIG. 19.

Note that in the image G2, the color coordinates at the pixel positions corresponding to the character pattern represented by the auxiliary information H1 has a color difference of about 1 gradation as compared with the case of performing color conversion by the first color conversion table T1, so that the auxiliary information H1 is embedded without being barely recognized visually.

Also, in a natural image, such as a photograph with a gray wall as its background, a photograph with the blue sky as its background and the like, it is usual to draw a widely used color, such as a gray, a blue and the like, such that hole color coordinates are reduced. However, even if colors were apparently the same, hole color coordinates can occur if there is a difference in digital value between colors. Therefore, auxiliary information H1 can be embedded in pattern form. Also, in computer graphics and the like, auxiliary information H1 cannot be embedded in pattern form when, in an image with a background whose digital value is exactly the same, the background does not correspond to hole color coordinates. In such a case, however, auxiliary information H1 can be embedded in pattern form, if hole color coordinates are caused to occur by applying slight noise.

On the other hand, in order to read out the embedded auxiliary information H1, a color conversion table T3', which converts all color coordinates embedded with information in image G2 (e.g., color coordinates J, J' in FIG. 10) to a color entirely differing from them (e.g., color X), is previously prepared. By performing color conversion of the image data S1 representing the image G2 by this color conversion table T3', character image M1' in which the character pattern of the auxiliary information H1 is represented by color X can be obtained. Note that in this embodiment, the character pattern read out from the image G2 is given "" like the character image M', because the character pattern is not one having values for all the pixels of the character pattern portion like the character image M1, but one having no pixel values at pixel positions other than hole color coordinates.

Figure 20:
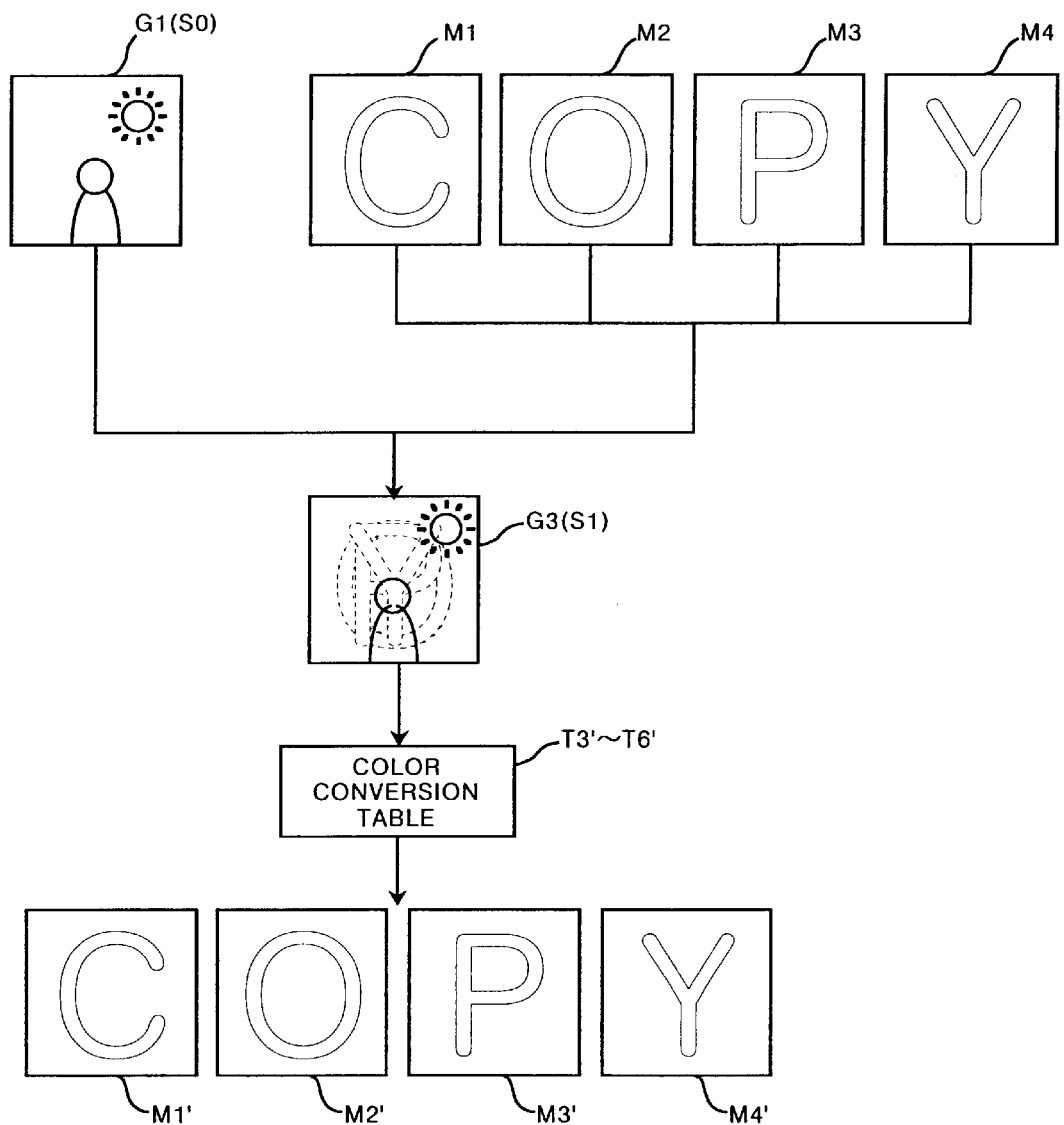
FIG. 20 is a diagram showing the process that is performed in an eighth embodiment of the present invention.

Note that while, in the seventh embodiment, a single character image M1 alone is embedded into the image G1, it is also possible to embed a plurality of character images into the image G1, from the fact that hole color coordinates are present in a single image about 27% of the total pixels, as described supra. This will hereinafter be described as an eighth embodiment. FIG. 20 is a diagram showing the process that is performed in the eighth embodiment. As shown in FIG. 20, in the eighth embodiment, assume that in converting the image G1 represented by the image data S0 from the first color space, to which the image G1 belongs to, to the second color space, character images M1 to M4 with character patterns of "C," "O," "P," and "Y" are embedded as auxiliary information H1 in pattern form.

In this case, the character images M1 to M4 are embedded into mutually different hole color coordinates (which may have one color or a plurality of sets of colors) on the image G1. Therefore, in converting the image G1 from the first color space, to which the image G1 belongs to, to the second color space, the first color conversion table T1 is used for ordinary pixel positions, as in the seventh embodiment, and a plurality of the second color conversion tables T2 are switched and used according to the kinds of the character images M1 to M4 for pixel positions at which auxiliary information H1 is embedded. For instance, in embedding the character image M1 of "C," a color conversion table that converts the color coordinate I (hole color coordinate) in FIG. 10 to the color coordinate J is used and in embedding the character image M2 of "O," a color conversion table that converts the color coordinate I' in FIG. 10 to the color coordinate J' is used. Hereinafter, in embedding the character images M3, M4 of "P" and "Y," a color conversion table, which converts hole color coordinates (e.g., color coordinates I0, I1) differing from color ordinates I, I' to color coordinates (e.g., color coordinates J0 J1) differing from color coordinates (e.g., color coordinates J0+1, J1+1) that are obtained when conversion is performed by the first color conversion table T1, is used. And with this, image G2 embedded as auxiliary information H1 with 4 character images M1 to M4 can be obtained.

On the other hand, in order to read out the embedded auxiliary information H1 consisting of 4 character images M1 to M4, 4 color conversion tables T3' to T6', which convert color coordinates embedded with information in the image G2 (e.g., color coordinates J, J', J0, J1)) to colors entirely differing from them (e.g., colors X0 to X3), respectively, are previously prepared. By sequentially performing color conversion of the image data S1 representing the image G2 by these 4 color conversion tables T3' to T6', character images M1' to M4' in which the character patterns of the character images M1 to M4 are represented by colors X0 to X3 can be obtained in sequence. At this time, by sequentially reproducing the character images M1' to M4', the embedded auxiliary information H can be displayed as a dynamic character string.

Note while, in the above-mentioned seventh and eighth embodiments, a character image has been embedded as auxiliary information H1, an image, such as an animation, and a figure, etc. can also be embedded as auxiliary information H1 in pattern form. In this case, by embedding a plurality of different patterns and reading out and reproducing the embedded patterns in sequence, as in the eighth embodiment, auxiliary information can be reproduced as a dynamic animation.

Incidentally, in the digital file generation service in a photographic laboratory, the negative film of a user is read by a scanner; image data for printing on which optimum image processing was performed for each image is generated; and this image data is recorded on a recording medium, such as CD-R and the like, and is delivered to the user. At this time, the image data for printing, as it is, is not recorded on a recording medium, but is recorded after conversion onto a color space for a monitor has been performed in such a manner that the image is optimally viewed when reproduced on the CRT monitor of the personal computer of the user. Here, the image data for printing employs a RGB signal that is a recording signal for a digital printer such as a color paper recorder, while the image data for a monitor employs a s-RGB signal, defined as a common color space by the international electrotechnical commission (IEC), or the like.

At this time, color conversion is performed such that the color of an image recorded on color paper coincides under a specific viewing condition with the color of an image displayed on a standard monitor defined by a s-RGB standard. Here, the color paper and the monitor both have 8-bit information for each color of RGB and are capable of expressing $2^{24}$ colors, but an image recorded on the color paper is an image in a color space corresponding to a color reproduced by a printer and an image displayed on the monitor is an image in a color space corresponding to the monitor. Therefore, when the color spaces are caused to coincide with each other, the circumstances that the latter becomes higher in data density in one color area and the former becomes higher in data density in another color area will occur. For this reason, a plurality of combinations of RGB, which are not present in the s-RGB space, are present in the color space of the printer.

For this reason, auxiliary information can be embedded as indicated in each of the above-mentioned embodiments by a difference between both color spaces. In such digital file generation service, comments at the photographing time, a photographed date, lens information of a camera, information about whether a stroboscope was used, information on a film kind and the like, a photographer's name, an order's name, parameters used in image processing and the like are enumerated as embeddable information.

Figure 21:
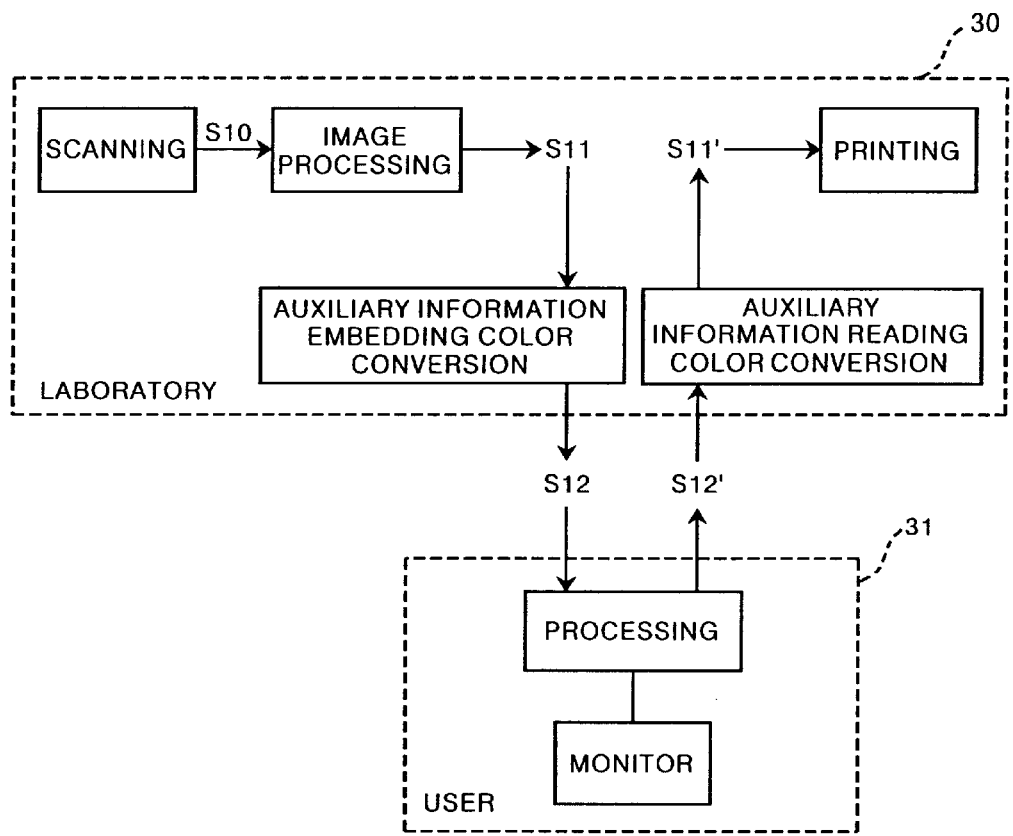
FIG. 21 is a schematic block diagram showing flow of the processing in digital file generation service.

FIG. 21 is a schematic block diagram showing flow of the processing in digital file generation service. First, in a laboratory 30, the negative film of a user 31 is scanned, thereby obtaining digital image data S10. With respect to this digital image data S10, image processing is performed such that an optimum image is reproduced as a print, this being used as image data S11 for printing. And in converting it to image data S12 for a monitor, auxiliary information is embedded. The image data S12 embedded with the auxiliary information is provided for the user 31. At this time, embedment of the auxiliary information is performed by specifying what information is embedded, when the user 31 makes a request to the laboratory 31 for service. Also, the auxiliary information is embedded into the image data S1, as described in each of the above-mentioned embodiments. The user 31 displays the provided image data S12 on a monitor and further performs processing, such as trimming, character embedment and the like, thereby obtaining processed image data S12'. And in the laboratory 30, the image data S12' is converted onto the color space for printing and the embedded auxiliary information is read out.

Figure 22A:
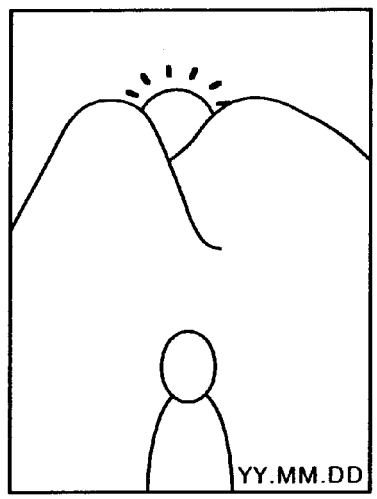
FIGS. 22a, 22b and 22c are diagrams showing an image printed in the digital file generation service.
Figure 22B:
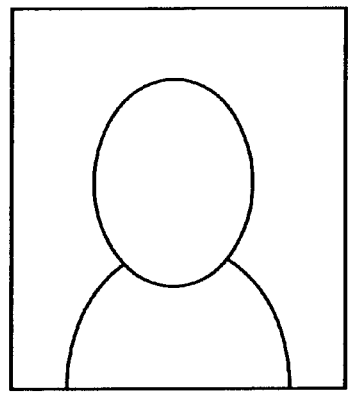
Figure 22C:
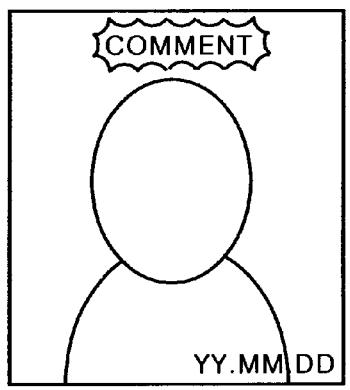
Figure 23:
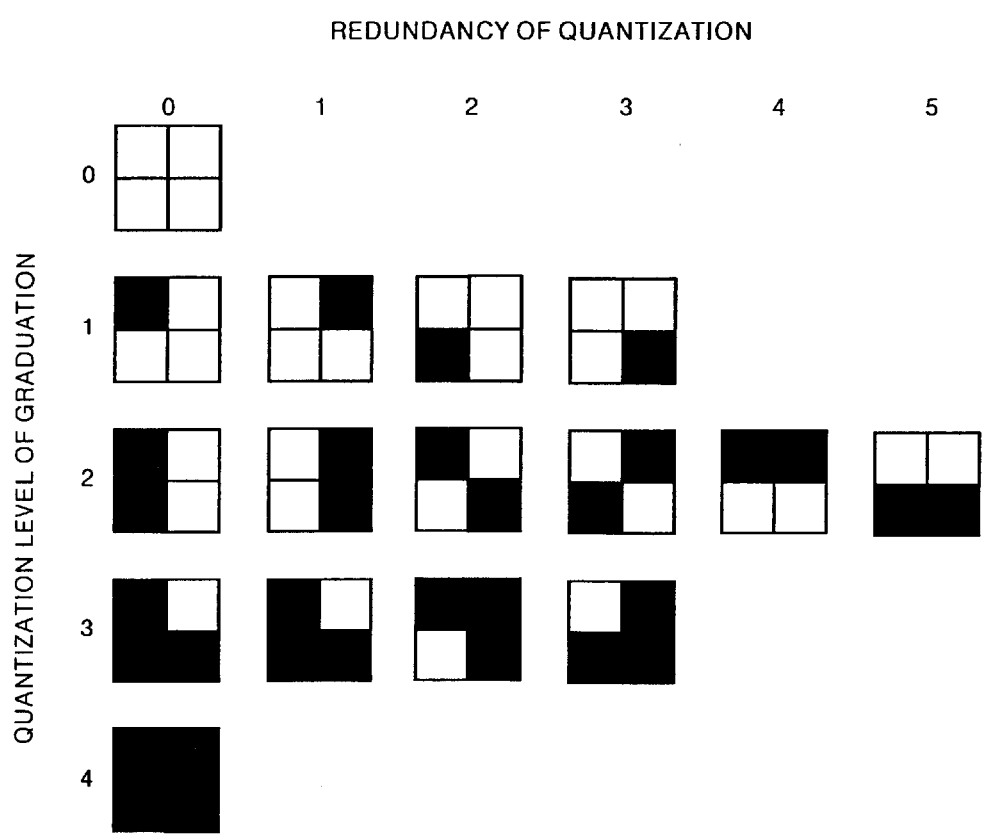
FIG. 23 is a model case of expressing gradation by a change in the area of 4 binary pixels employed as one unit.

At this time, in the laboratory 30 it is possible to read out embedded auxiliary information, as described in each of the above-mentioned embodiments, by detecting specific color coordinate data. And for example, when embedded auxiliary information is a photographed date and comments at the photographing time, the information can be properly laid out on the processed image and printed. That is, in the case where a request for trimming is made in conventional printing service, when an original image includes a photographed date, as shown in FIG. 22(a), the portion of the photographed date is cut and therefore the image after trimming includes no photographed date. On the other hand, in this embodiment, information about a photographed date is included in the image data S12 as auxiliary information. Therefore, even if trimming were performed as shown in FIG. 22(c), the information about a photographed date can be printed while it is being included in the trimmed image. When comments are included as auxiliary information, they can also be printed simultaneously with the trimmed image.

Note that although a template with various images and photographs laid out thereon is provided for the user 31 so that an image, which the user 31 has, and the template can be combined, there are cases where the template has copyright. In such a case, the copyright information of the creator of a template is embedded as auxiliary information into template data representing the template. With this, it can be confirmed whether or not the template has copyright, by reading out the auxiliary information during printing in the laboratory 30. And when a template has copyright, the laboratory 30 can collect the copyright royalty from the user 31 by adding the copyright royalty to a printing charge.

Also, in the laboratory 30, image processing optimum for printing is performed and then auxiliary information is embedded along with color conversion, whereby the image data S12 is obtained. Therefore, it can be confirmed whether or not image processing optimum for printing has already been performed in a specific laboratory 30, by confirming whether or not auxiliary information has been embedded into the processed image data S12' delivered from the user 31. Therefore, in the case where auxiliary information has been embedded into the image data S12', duplication of the same image processing can be prevented, because it can be confirmed that image processing optimum for printing has already been performed.

What is claimed is:

1. An information embedding method of deeply encrypting and embedding into image data auxiliary information related to said image data, said information embedding method comprising the steps of:

when an image is converted from a first color space, to which said image belongs, to a second color space having a color reproduction characteristic differing from said first color space, selecting a single second conversion table from a plurality of second conversion tables for each of a plurality of pieces of auxiliary information, calculating a quantization error in converting said image data to said second color space, based on a difference in color reproduction characteristic between said first and second color spaces; and encrypting and embedding said auxiliary information by switching a first conversion table and said selected second conversion table in accordance with a position on said image represented by said image data into said quantization error.

2. The information embedding method as set forth in claim 1, wherein a difference in gamut between said first color space and said second color space is decided, and for a color space inside a gamut in both color spaces, a geometrical error, which occurs when a color coordinate in said first color space is converted to a corresponding color coordinate in said second color space, is calculated as said quantization error.

3. The information embedding method as set forth in claim 1, wherein a difference in gamut between said first color space and said second color space is decided, a color space in said second color space outside the gamut of said first color space is compressed inside the gamut of said first color space, and an error occurring by the compression is calculated as said quantization error.

4. The information embedding method as set forth in claim 1, wherein said auxiliary information is embedded into said quantization error in a space where a quantization resolution of said first color space shrinks.

5. The information embedding method as set forth in claim 1, wherein said auxiliary information is embedded into said quantization error in a space where a quantization resolution of said first color space increases.

6. The information embedding method as set forth in claim 1, wherein said first conversion table is for converting a color coordinate in said first color space to a corresponding color coordinate in said second color space and said selected second conversion table is for converting a predetermined color coordinate in said first color space to a different color coordinate adjacent to a color coordinate in said second color space corresponding to said predetermined color coordinate.

7. An auxiliary information reading method of reading out auxiliary information from image data embedded with said auxiliary information by the information embedding method as set forth in claim 6, said auxiliary information reading method comprising the steps of:

converting said image data by said first conversion table and obtaining first image data; and reading out said auxiliary information, based on a difference in color between the image data embedded with said auxiliary information and said first image data.

8. An image output method of outputting image data embedded with said auxiliary information by the information embedding method as set forth in claim 6, said image output method comprising the steps of:

reading out said auxiliary information from said image data; and performing a process based on said auxiliary information with respect to said image data and outputting said image data.

9. The image output method as set forth in claim 8, wherein said image data is given said auxiliary information so that said auxiliary information can be recognized visually and is output.

10. A computer readable recording medium having recorded a program for causing a computer to execute a method of reading out auxiliary information from image data embedded with said auxiliary information by the information embedding method as set forth in claim 6, said program comprising the procedures of:

converting said image data by said first conversion table and obtaining first image data; and reading out said auxiliary information, based on a difference in color between the image data embedded with said auxiliary information and said first image data.

11. A computer readable recording medium having recorded a program for causing a computer to execute an image output method of outputting image data embedded with auxiliary information by the information embedding method as set forth in claim 6, said program comprising the procedures of:

reading out said auxiliary information from said image data; and performing a process based on said auxiliary information with respect to said image data and outputting said image data.

12. The computer readable recording medium as set forth in claim 11, wherein said outputting procedure is a procedure of giving said auxiliary information to said image so that said auxiliary information can be recognized visually and outputting said image data.

13. The information embedding method as set forth in claim 1, wherein said first conversion table is for converting a color coordinate in said first color space to a corresponding color coordinate in said second color space and said plurality of second conversion tables are for converting a plurality of predetermined color coordinates in said first color space to different color coordinates adjacent to color coordinates in said second color space respectively corresponding to said plurality of predetermined color coordinates, said plurality of second conversion tables corresponding in number to said plurality of predetermined color coordinates.

14. The information embedding method as set forth in claim 1, wherein said first conversion table is for converting a color coordinate in said first color space to a corresponding color coordinate in said second color space and a plurality of second conversion tables are for converting a plurality of predetermined color coordinates in said first color space to different color coordinates adjacent to color coordinates in said second color space respectively corresponding to said plurality of predetermined color coordinates, said plurality of second conversion tables corresponding in number to said plurality of predetermined color coordinates.

15. The information embedding method as set forth in claim 14, wherein said plurality of different pieces of auxiliary information include partition information for partitioning positions at which said plurality of pieces of auxiliary information are embedded.

16. The information embedding method as set forth in claim 1, wherein said first conversion table is for converting a color coordinate in said first color space to a corresponding color coordinate in said second color space and said selected second conversion table is for converting a plurality of predetermined color coordinates in said first color space to different color coordinates adjacent to color coordinates in said second color space respectively corresponding to said plurality of predetermined color coordinates.

17. An information embedding apparatus for deeply encrypting and embedding into image data auxiliary information related to said image data, said information embedding apparatus comprising:

when an image is converted from a first color space, to which said image belongs, to a second color space having a color reproduction characteristic differing from said first color space, a single second conversion table is selected from a plurality of second conversion tables for each of a plurality of pieces of auxiliary information, quantization error calculation means for calculating a quantization error in converting said image data to said second color space, based on a difference in color reproduction characteristic between said first and second color spaces; and embedment means for encrypting and embedding said auxiliary information by switching a first conversion table and said selected second conversion table in accordance with a position on said image represented by said image data into said quantization error.

18. The information embedding apparatus as set forth in claim 17, wherein said quantization error calculation means is further provided with decision means for deciding a difference in gamut between said first color space and said second color space and is means for calculating a geometrical error, which occurs when a color coordinate in said first color space is converted to a corresponding color coordinate in said second color space, as said quantization error, for a color space inside a gamut in both color spaces.

19. The information embedding apparatus as set forth in claim 17, wherein said quantization error calculation means is further provided with decision means for deciding a difference in gamut between said first color space and said second color space and is means for compressing a color space in said second color space, which is outside the gamut of said first color space, inside the gamut of said first color space and for calculating an error, which occurs by the compression, as said quantization error.

20. The information embedding apparatus as set forth in claim 17, wherein said embedment means is means for embedding said auxiliary information into a quantization error in a space where a quantization resolution of said first color space shrinks.

21. The information embedding apparatus as set forth in claim 17, wherein said embedment means is means for embedding said auxiliary information into a quantization error in a space where a quantization resolution of said first color space increases.

22. The information embedding apparatus as set forth in claim 17, wherein said quantization error calculation means is provided with means for generating said first conversion table for converting a color coordinate in said first color space to a corresponding color coordinate in said second color space and said selected second conversion table for converting a predetermined color coordinate in said first color space to a different color coordinate adjacent to a color coordinate in said second color space corresponding to said predetermined color coordinate; and said embedment means is means for embedding said auxiliary information by switching said first conversion table and said selected second conversion table in accordance with a position on said image represented by said image data, when said image data is converted from said first color space to said second color space.

23. An auxiliary information reading apparatus for reading out auxiliary information from image data embedded with said auxiliary information by the information embedding apparatus as set forth in claim 22, said auxiliary information reading apparatus comprising:

conversion means for converting said image data by said first conversion table and obtaining first image data; and read means for reading out said auxiliary information, based on a difference in color between the image data embedded with said auxiliary information and said first image data.

24. An image output apparatus for outputting image data embedded with said auxiliary information by the information embedding apparatus as set forth in claim 22, said image output apparatus comprising:

read means for reading out said auxiliary information from said image data; and output means for performing a process based on said auxiliary information with respect to said image data and outputting said image data.

25. The image output apparatus as set forth in claim 24, wherein said output means is means for giving said auxiliary information to said image so that said auxiliary information can be recognized visually and outputting said image data.

26. The information embedding apparatus as set forth in claim 17, wherein said quantization error calculation means is provided with means for generating said first conversion table for converting a color coordinate in said first color space to a corresponding color coordinate in said second color space and said plurality of second conversion tables for converting a plurality of predetermined color coordinates in said first color space to different color coordinates adjacent to color coordinates in said second color space respectively corresponding to said plurality of predetermined color coordinates, said plurality of second conversion tables corresponding in number to said plurality of predetermined color coordinates; and said embedment means is means for selecting said single second conversion table from said plurality of second conversion tables in accordance with a content of said auxiliary information and embedding said auxiliary information by switching said first conversion table and said selected second conversion table in accordance with a position on said image represented by said image data, when said image data is converted from said first color space to said second color space.

27. The information embedding apparatus as set forth in claim 17, wherein said quantization error calculation means is provided with means for generating said first conversion table for converting a color coordinate in said first color space to a corresponding color coordinate in said second color space and said plurality of second conversion tables for converting a plurality of predetermined color coordinates in said first color space to different color coordinates adjacent to color coordinates in said second color space respectively corresponding to said plurality of predetermined color coordinates, said plurality of second conversion tables corresponding in number to said plurality of predetermined color coordinates; and said embedment means is means for selecting said single second conversion table from said plurality of second conversion tables for each of a plurality of pieces of auxiliary information and embedding a plurality of different pieces of auxiliary information by switching said first conversion table and said selected second conversion table in accordance with a position on said image represented by said image data while selecting said single second conversion table for each said auxiliary information, when said image data is converted from said first color space to said second color space.

28. The information embedding apparatus as set forth in claim 27, wherein said plurality of different pieces of auxiliary information include partition information for partitioning positions at which said plurality of pieces of auxiliary information are embedded.

29. The information embedding apparatus as set forth in claim 17, wherein said quantization error calculation means is provided with means for generating said first conversion table for converting a color coordinate in said first color space to a corresponding color coordinate in said second color space and said selected second conversion table for converting a plurality of predetermined color coordinates in said first color space to different color coordinates adjacent to color coordinates in said second color space respectively corresponding to said plurality of predetermined color coordinates; and said embedment means is means for embedding a plurality of different pieces of auxiliary information for each said color coordinate by switching said first conversion table and said second conversion table in accordance with a color coordinate on said image represented by said image data, when said image data is converted from said first color space to said second color space.

30. A computer readable recording medium having recorded a program for causing a computer to execute an information embedding method of deeply encrypting and embedding into image data auxiliary information related to said image data, said program comprising the procedures of:

when an image is converted from a first color space, to which said image belongs, to a second color space having a color reproduction characteristic differing from said first color space, selecting a single second conversion table from a plurality of second conversion tables for each of a plurality of pieces of auxiliary information, calculating a quantization error in converting said image data to said second color space, based on a difference in color reproduction characteristic between said first and second color spaces; and encrypting and embedding said auxiliary information by switching a first conversion table and said selected second conversion table in accordance with a position on said image represented by said image data into said quantization error.

31. The computer readable recording medium as set forth in claim 30, wherein said quantization error calculating procedure further has a procedure of deciding a difference in gamut between said first color space and said second color space and is a procedure of calculating a geometrical error, which occurs when a color coordinate in said first color space is converted to a corresponding color coordinate in said second color space, as said quantization error, for a color space inside a gamut in both color spaces.

32. The computer readable recording medium as set forth in claim 30, wherein said quantization error calculating procedure further has a procedure of deciding a difference in gamut between said first color space and said second color space and is a procedure of compressing a color space in said second color space, which is outside the gamut of said first color space, inside the gamut of said first color space and of calculating an error, which occurs by the compression, as said quantization error.

33. The computer readable recording medium as set forth in claim 30, wherein said embedding procedure is a procedure of embedding said auxiliary information into said quantization error in a space where a quantization resolution of said first color space shrinks.

34. The computer readable recording medium as set forth in claim 30, wherein said embedding procedure is a procedure of embedding said auxiliary information into said quantization error in a space where a quantization resolution of said first color space increases.

35. The computer readable recording medium as set forth in claim 30, wherein said quantization error calculating procedure has a procedure of generating a first conversion table for converting a color coordinate in said first color space to a corresponding color coordinate in said second color space and a second conversion table for converting a predetermined color coordinate in said first color space to a different color coordinate adjacent to a color coordinate in said second color space corresponding to said predetermined color coordinate.

36. The computer readable recording medium as set forth in claim 30, wherein said quantization error calculating procedure has a procedure of generating said first conversion table for converting a color coordinate in said first color space to a corresponding color coordinate in said second color space and said plurality of second conversion tables for converting a plurality of predetermined color coordinates in said first color space to different color coordinates adjacent to color coordinates in said second color space respectively corresponding to said plurality of predetermined color coordinates, said plurality of second conversion tables corresponding in number to said plurality of predetermined color coordinates.

37. The computer readable recording medium as set forth in claim 30, wherein said quantization error calculating procedure has a procedure of generating said first conversion table for converting a color coordinate in said first color space to a corresponding color coordinate in said second color space and said plurality of second conversion tables for converting a plurality of predetermined color coordinates in said first color space to different color coordinates adjacent to color coordinates in said second color space respectively corresponding to said plurality of predetermined color coordinates, said plurality of second conversion tables corresponding in number to said plurality of predetermined color coordinates.

38. The computer readable recording medium as set forth in claim 37, wherein said plurality of different pieces of auxiliary information include partition information for partitioning positions at which said plurality of pieces of auxiliary information are embedded.

39. The computer readable recording medium as set forth in claim 30, wherein said quantization error calculating procedure has a procedure of generating said first conversion table for converting a color coordinate in said first color space to a corresponding color coordinate in said second color space and said selected second conversion table for converting a plurality of predetermined color coordinates in said first color space to different color coordinates adjacent to color coordinates in said second color space respectively corresponding to said plurality of predetermined color coordinates.

* * * * *